(12) United States Patent
Aridomi et al.

(10) Patent No.: US 11,407,207 B2
(45) Date of Patent: Aug. 9, 2022

(54) DECORATIVE FILM, DECORATION METHOD, METHOD FOR MANUFACTURING DECORATIVE MOLDED ARTICLE, AND DECORATIVE MOLDED FILM

(71) Applicant: FUJIFILM CORPORATION, Tokyo (JP)

(72) Inventors: Takashi Aridomi, Shizuoka (JP); Takeshi Hama, Kanagawa (JP); Shinichi Kanna, Kanagawa (JP); Yujiro Yanai, Kanagawa (JP); Yuichi Hayata, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/953,342

(22) Filed: Nov. 20, 2020

(65) Prior Publication Data

US 2021/0070022 A1 Mar. 11, 2021

Related U.S. Application Data

(63) Continuation of application No. PCT/JP2019/025213, filed on Jun. 25, 2019.

(30) Foreign Application Priority Data

Jul. 2, 2018 (JP) .............................. JP2018-126374
May 29, 2019 (JP) .............................. JP2019-100138

(51) Int. Cl.
*B32B 27/08* (2006.01)
*C09J 7/38* (2018.01)
(Continued)

(52) U.S. Cl.
CPC .............. *B32B 27/08* (2013.01); *B32B 7/023* (2019.01); *B32B 27/20* (2013.01); *B32B 27/308* (2013.01);
(Continued)

(58) Field of Classification Search
CPC .... C08K 3/04; C08K 3/36; C08K 7/26; C08L 75/08; B32B 2255/10; B32B 2255/20;
(Continued)

(56) References Cited

U.S. PATENT DOCUMENTS

2008/0090029 A1 4/2008 Hoshino et al.
2016/0214285 A1 7/2016 Taguchi et al.
(Continued)

FOREIGN PATENT DOCUMENTS

| CN | 101035671 A | 9/2007 |
| CN | 105593723 A | 5/2016 |

(Continued)

OTHER PUBLICATIONS

Extended European Search Report dated Jul. 13, 2021, issued in corresponding EP Patent Application No. 19830305.9.
(Continued)

*Primary Examiner* — Lawrence D Ferguson
(74) *Attorney, Agent, or Firm* — Solaris Intellectual Property Group, PLLC

(57) ABSTRACT

Provided are a decorative film including, in the following order, a temporary support, a colored layer, a cholesteric liquid crystal layer, and a protective layer, in which the decorative film is a film for viewing the colored layer through the cholesteric liquid crystal layer; a decoration method or a method for manufacturing a decorative molded article; and a decorative molded film including, in the following order, a base material, a colored layer, a cholesteric liquid crystal layer, and a protective layer, or including,
(Continued)

in the following order, a colored layer, a cholesteric liquid crystal layer, a base material, and a protective layer, in which the decorative molded film is a film for viewing the colored layer through the cholesteric liquid crystal layer.

13 Claims, 3 Drawing Sheets

(51) Int. Cl.
    *B32B 7/023*     (2019.01)
    *B32B 27/20*     (2006.01)
    *B32B 27/30*     (2006.01)
    *B32B 27/36*     (2006.01)
    *B32B 27/40*     (2006.01)
    *C08K 3/04*     (2006.01)
    *C08K 3/36*     (2006.01)
    *C08K 7/26*     (2006.01)

(52) U.S. Cl.
    CPC .............. *B32B 27/36* (2013.01); *B32B 27/40* (2013.01); *C08K 3/04* (2013.01); *C08K 3/36* (2013.01); *C08K 7/26* (2013.01); *C09J 7/38* (2018.01); *B32B 2307/402* (2013.01); *B32B 2307/412* (2013.01); *C09J 2433/00* (2013.01); *C09J 2475/00* (2013.01)

(58) Field of Classification Search
    CPC .......... B32B 2255/26; B32B 2262/101; B32B 2262/106; B32B 2264/067; B32B 2264/10; B32B 2264/102; B32B 2264/104; B32B 2264/105; B32B 2307/21; B32B 2307/402; B32B 2307/4026; B32B 2307/41; B32B 2307/412; B32B 2307/416; B32B 2307/418; B32B 2307/584; B32B 2307/71; B32B 2307/732; B32B 2307/748; B32B 2307/762; B32B 23/04; B32B 23/08; B32B 2419/00; B32B 2439/00; B32B 2451/00; B32B 2457/20; B32B 2509/00; B32B 2605/08; B32B 27/08; B32B 27/20; B32B 27/285; B32B 27/308; B32B 27/32; B32B 27/325; B32B 27/34; B32B 27/36; B32B 27/365; B32B 27/40; B32B 7/023; B32B 7/06; B32B 7/12; C09J 2301/122; C09J 2433/00; C09J 2475/00; C09J 7/29; C09J 7/38

See application file for complete search history.

(56) References Cited

U.S. PATENT DOCUMENTS

2018/0370096 A1   12/2018   Fuchs et al.
2020/0033522 A1    1/2020   Takasago et al.

FOREIGN PATENT DOCUMENTS

| | | |
|---|---|---|
| JP | S51-7502 B2 | 3/1976 |
| JP | 2000-158899 A | 6/2000 |
| JP | 2001-105795 A | 4/2001 |
| JP | 2018-518403 A | 7/2018 |
| WO | 2006/038561 A1 | 4/2006 |
| WO | 2015/050256 A1 | 4/2015 |
| WO | 2016/202672 A2 | 12/2016 |
| WO | 2018/186184 A1 | 10/2018 |

OTHER PUBLICATIONS

International Search Report issued in International Application No. PCT/JP2019/025213 dated Sep. 10, 2019.
Written Opinion of the ISA issued in International Application No. PCT/JP2019/025213 dated Sep. 10, 2019.
English language translation of the following: Office action dated Sep. 21, 2021 from the JPO in a Japanese patent application No. 2020-528812 corresponding to the instant patent application. This office action translation is submitted now in order to supplement the understanding of the cited references which are being disclosed in the instant Information Disclosure Statement.
Office Action dated Apr. 12, 2022, issued by the EPO in corresponding EP Patent Application No. 19830305.9.

DECORATIVE FILM, DECORATION METHOD, METHOD FOR MANUFACTURING DECORATIVE MOLDED ARTICLE, AND DECORATIVE MOLDED FILM

CROSS-REFERENCE TO RELATED APPLICATIONS

This application is a continuation application of International Application No. PCT/JP2019/025213, filed Jun. 25, 2019, the disclosure of which is incorporated herein by reference in its entirety. Further, this application claims priority from Japanese Patent Application No. 2018-126374, filed Jul. 2, 2018, and Japanese Patent Application No. 2019-100138, filed May 29, 2019, the disclosures of which are incorporated herein by reference in their entirety.

BACKGROUND OF THE INVENTION

1. Field of the Invention

The present disclosure relates to a decorative film, a decoration method, a method for manufacturing a decorative molded article, and a decorative molded film.

2. Description of the Related Art

A decorative molded article, in which a decorative film is disposed on a surface of a resin molded article to color the surface in a desired color tone or to provide a desired pattern on the surface, has been known.

The decorative molded article is obtained, for example, by previously disposing a decorative molded film in a mold and injection-molding a base material resin into the mold, thereby having a structure in which the surface of the resin molded article is integrated with the decorative film.

In the present disclosure, the decorative molded film refers to a film formed by attaching a decorative film to a base material for molding.

Here, the injection mold of the base material resin after previously disposing the decorative molded film in the mold is generally referred to as film insert molding or simply insert molding.

In addition, the decorative molded article may be manufactured by attaching a decorative film to a molded article after molding.

In addition, as a hot stamp foil in the related art, JP2001-105795A discloses a hot stamp foil characterized in that a cholesteric liquid crystalline polymer layer having a selective reflection wavelength range in visible light is laminated as a transfer layer.

SUMMARY OF THE INVENTION

An object to be achieved by one embodiment of the present invention is to provide a decorative film having excellent wiping resistance and color variability depending on a viewing direction.

In addition, an object to be achieved by another embodiment of the present invention is to provide a decoration method using the above-described decorative film and a method for manufacturing a decorative molded article.

In addition, an object to be achieved by still another embodiment of the present invention is to provide a decorative molded film having excellent wiping resistance and color variability depending on a viewing direction.

The methods for achieving the above-described objects include the following aspects.

<1> A decorative film comprising, in the following order: a temporary support; a colored layer; a cholesteric liquid crystal layer; and a protective layer, in which the decorative film is a film for viewing the colored layer through the cholesteric liquid crystal layer.

<2> The decorative film according to <1> further comprising a resin layer between the cholesteric liquid crystal layer and the protective layer.

<3> The decorative film according to <1> or <2>, in which a refractive index of the protective layer is 1.2 to 1.5.

<4> The decorative film according to any one of <1> to <3>, in which the protective layer contains at least one resin selected from the group consisting of a siloxane resin having voids, a fluororesin, and a urethane resin.

<5> The decorative film according to any one of <1> to <4>, in which a thickness of the protective layer is 4 µm or more, and a thickness of the cholesteric liquid crystal layer is less than 4 µm.

<6> The decorative film according to any one of <1> to <5>, in which a thickness of the cholesteric liquid crystal layer is 1 µm or less.

<7> The decorative film according to any one of <1> to <6>, in which a thickness of the colored layer is 3 µm or more.

<8> The decorative film according to any one of <1> to <7>, in which the colored layer includes a pigment as a colorant.

<9> The decorative film according to any one of <1> to <8>, in which the colored layer is a layer formed by curing at least a bifunctional or trifunctional polymerizable compound which has at least one partial structure selected from the group consisting of a urethane bond and an alkyleneoxy group having 2 or 3 carbon atoms.

<10> The decorative film according to any one of <1> to <9> further comprising, a layer containing an ultraviolet absorber between the cholesteric liquid crystal layer and the protective layer.

<11> The decorative film according to <10>, in which the ultraviolet absorber having a concentration of 0.001% by mass in a chloroform solution at 25° C. has less than 70% of a light transmittance per 1 cm of optical path length at any wavelengths of 300 nm and 350 nm.

<12> The decorative film according to any one of <1> to <11>, in which the decorative film is a decorative film for molding.

<13> A decoration method comprising, a step of peeling off the temporary support from the decorative film according to any one of <1> to <12>, and a step of attaching the decorative film from which the temporary support has been peeled off to a base material from a colored layer side.

<14> The decoration method according to <13> further comprising, a step of forming a pressure sensitive adhesive layer on a surface of the decorative film from which the temporary support has been peeled off, from which the temporary support has been peeled off.

<15> The decoration method according to <13> or <14>, in which the base material is a base material for molding.

<16> A method for manufacturing a decorative molded article comprising, a step of peeling off the temporary support from the decorative film according to any one of <1> to <12>, a step of attaching the decorative film from which the temporary support has been peeled off to a base material for molding from a colored layer side, and a step of molding the base material for molding to which the decorative film has been attached.

<17> A decorative molded film comprising, in the following order, a base material, a colored layer, a cholesteric liquid crystal layer, and a protective layer, in which the decorative molded film is a film for viewing the colored layer through the cholesteric liquid crystal layer.

<18> A decorative molded film comprising, in the following order, a colored layer, a cholesteric liquid crystal layer, a base material, and a protective layer, in which the decorative molded film is a film for viewing the colored layer through the cholesteric liquid crystal layer.

According to one embodiment of the present invention, it is possible to provide a decorative film having excellent wiping resistance and color variability depending on a viewing direction.

In addition, according to another embodiment of the present invention, it is possible to provide a decoration method using the above-described decorative film and a method for manufacturing a decorative molded article.

In addition, according to still another embodiment of the present invention, it is possible to provide a decorative molded film having excellent wiping resistance and color variability depending on a viewing direction.

DESCRIPTION OF THE PREFERRED EMBODIMENTS

Figure 1:
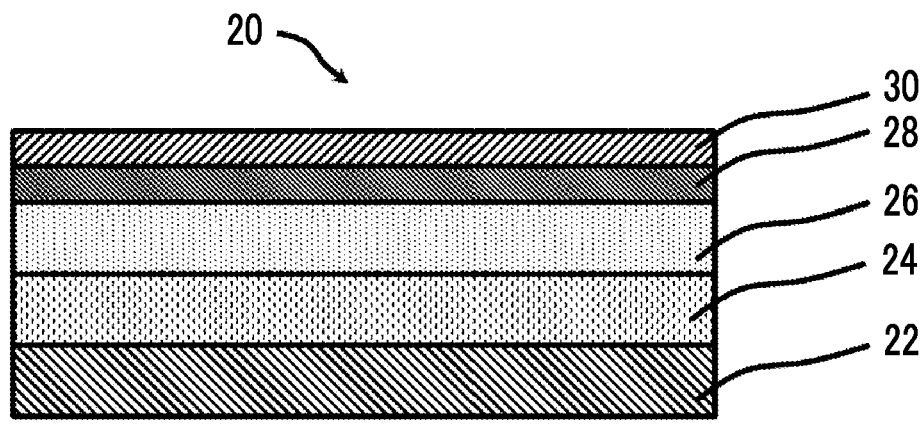
FIG. 1 is a schematic cross-sectional view showing one example of a decorative film according to the embodiment of the present disclosure.

Hereinafter, one embodiment of a method for manufacturing a decorative film according to the present disclosure will be described. However, the present invention is not limited to the following embodiments, and can be implemented with appropriate modification within the scope of the object of the present disclosure.

In a case where substitution or unsubstitution is not noted in regard to the notation of a "group" (atomic group) in the present disclosure, the "group" includes not only a group not having a substituent but also a group having a substituent. For example, an "alkyl group" includes not only an alkyl group having no substituent (unsubstituted alkyl group), but also an alkyl group having a substituent (substituted alkyl group). In addition, an "organic group" in the present specification refers to a group including at least 1 carbon atom.

In the present disclosure, "actinic ray" or "radiation" means, for example, a bright line spectrum of a mercury lamp, far ultraviolet ray typified by an excimer laser, extreme ultraviolet ray (EUV light), X-ray, electron beam (EB), and the like. In the present specification, "light" means an actinic ray or radiation.

In the present disclosure, unless otherwise specified, "exposure" includes not only exposure by a bright line spectrum of a mercury lamp, far ultraviolet ray typified by an excimer laser, extreme ultraviolet ray, X-ray, and the like, but also exposure by a particle beam such as an electron beam and an ion beam.

In the present disclosure, "to" is used to refer to a meaning including numerical values denoted before and after "to" as a lower limit value and an upper limit value.

In the present disclosure, (meth)acrylate represents acrylate and methacrylate, and (meth)acrylic represents acrylic and methacrylic.

In the present disclosure, the weight-average molecular weight (Mw), number-average molecular weight (Mn), and dispersity (also referred to as molecular weight distribution) (Mw/Mn) of a resin component are defined as a value in terms of polystyrene according to a gel permeation chromatography (GPC) measurement (solvent: tetrahydrofuran, flow amount (sample injection amount): 10 µL, column: TSK gel Multipore HXL-M manufactured by Tosoh Corporation, column temperature: 40° C., flow rate: 1.0 mL/min, detector: refractive index detector) using a GPC device (HLC-8120GPC manufactured by Tosoh Corporation).

In the present specification, in a case where a plurality of substances corresponding to each component in a composition is present, the amount of each component in the composition means the total amount of the plurality of substances present in the composition, unless otherwise specified.

In the present specification, the term "step" includes not only the independent step but also a step in which intended purposes are achieved even in a case where the step cannot be precisely distinguished from other steps.

In the present specification, the "total solid content" refers to a total mass of components obtained by removing a solvent from the whole composition of the composition. In addition, the "solid content" is a component obtained by removing a solvent as described above, and for example, the component may be solid or may be liquid at 25° C.

In the present specification, "% by mass" has the same definition as "% by weight", and "part by mass" has the same definition as "part by weight".

In addition, in the present specification, a combination of two or more preferred aspects is a more preferred aspect.

(Decorative Film)

A decorative film according to an embodiment of the present disclosure is a decorative film including, in the following order, a temporary support, a colored layer, a cholesteric liquid crystal layer, and a protective layer, in which the decorative film is a film for viewing the colored layer through the cholesteric liquid crystal layer.

The application of the decorative film according to the embodiment of the present disclosure is not particularly limited, and specific examples thereof include a decoration of automobiles, home appliances, audio products, computers, displays, in-vehicle products, watches, accessories, optical parts, doors, window glasses, building materials, and the like.

Among these, the decorative film according to the embodiment of the present disclosure can be suitably used as a decorative film used for decoration of an automobile exterior.

In addition, since the decorative film according to the embodiment of the present disclosure also has excellent three-dimensional moldability, the decorative film according to the embodiment of the present disclosure is suitable as a decorative film for molding, which is used for molding such as three-dimensional molding and insert molding, and more suitable as a decorative film for three-dimensional molding.

For example, the decorative film according to the embodiment of the present disclosure is suitably used as a decorative molded film that the temporary support is peeled off from the decorative film, a pressure sensitive adhesive layer described later is provided to the decorative film, and a base material for molding described later is attached to the decorative film, or as a decorative molded article in which a pressure sensitive adhesive layer is attached to a molded article.

In the related art, as a surface decoration used for home appliances, electronic devices, mobile phones, and the like, printing, painting, vapor deposition, plating, and the like have been used.

However, from the aspects of problems such as functionality addition and environmental load, and the possibility of replacement, a decoration technique by using a decorative film has been widely used.

On the other hand, new designability is required from the widespread preference of users.

In particular, the present inventors have newly found a design in which a change (also referred to as "color variability") in color (for example, tint and fine hue) which occurs depending on the viewing angle, and considered the introduction of the design as a decoration technique.

In addition, JP2001-105795A discloses a hot stamp foil in which a cholesteric liquid crystalline polymer layer is laminated as a transfer layer, but does not disclose that, as the decorative film according to the embodiment of the present disclosure, the colored layer is viewed through the cholesteric liquid crystal layer.

As a result of intensive studies, the present inventors have found that, with the decorative film having the above-described structure, the wiping resistance and the color variability depending on the viewing direction are excellent.

In the present disclosure, the wiping resistance refers to a property in which scratches are hard to occur in a case of wiping off the surface of the decorative film. In particular, the cholesteric liquid crystal layer has a problem in which the strength is insufficient and the wiping resistance is insufficient in many cases.

In addition, in the present disclosure, the color variability depending on the viewing direction refers to a change in color in a case of viewing from an angle perpendicular to and an angle of 45° to the surface direction (also referred to as a "film surface direction") of the decorative film, and as the degree of change in color is greater, the color variability depending on the viewing direction is more excellent.

The detailed mechanism of the above-described effects is not clear, but is assumed as follows. By having, in the following order, a temporary support, a colored layer, a cholesteric liquid crystal layer, and a protective layer, and viewing the colored layer through the cholesteric liquid crystal layer, it is assumed that, based on the anisotropy depending on an angle of incidence ray in the cholesteric liquid crystal layer, the change in color occurs depending on the angle at which the colored layer is viewed, and special designability (also referred to as "visibility") is exhibited. In addition, it is assumed that, by having the protective layer on a side closer to the viewer than the cholesteric liquid crystal layer, that is, the surface side, the wiping resistance is excellent.

Hereinafter, the decorative film according to the embodiment of the present disclosure will be described in detail.

[Preferred Thickness of Each Layer]

The decorative film according to the embodiment of the present disclosure has, in the following order, a temporary support, a colored layer, a cholesteric liquid crystal layer, and a protective layer.

The thickness of the temporary support is not particularly limited, but from the viewpoint of peelability, is preferably 10 μm to 500 μm, more preferably 20 μm to 300 μm, and particularly preferably 50 μm to 150 μm.

The thickness of the colored layer is not particularly limited, but from the viewpoint of visibility and three-dimensional moldability, is preferably 0.5 μm or more, more preferably 3 μm or more, still more preferably 3 μm to 50 μm, and particularly preferably 3 μm to 20 μm.

From the viewpoint of color variability depending on the viewing direction, the thickness of the cholesteric liquid crystal layer is preferably less than 4 μm, more preferably 1 μm or less, still more preferably 0.05 μm to 1 μm, and particularly preferably 0.1 μm to 0.7 μm.

The thickness of the protective layer is not particularly limited, but from the viewpoint of wiping resistance and three-dimensional moldability, is preferably 2 μm or more, more preferably 4 μm or more, still more preferably 4 μm to 50 μm, and particularly preferably 4 μm to 20 μm.

In addition, from the viewpoint of color variability depending on the viewing direction, wiping resistance, and three-dimensional moldability, it is preferable that the thickness of the cholesteric liquid crystal layer is larger than the thickness of the protective layer, and it is more preferable that the thickness of the protective layer is 4 μm or more and the thickness of the cholesteric liquid crystal layer is less than 4 μm.

The thickness of each layer can be measured by a cross-section observation method of cutting a decorative film in a direction perpendicular to the film surface, observing the cut surface with a scanning electron microscope (SEM) or an optical microscope, and measuring the thickness of the layer in that range, a method of directly measuring, with a caliper, a film thickness meter, or the like, the decorative film, or a peeled layer in a case of being peelable, and the like.

[Temporary Support]

As the temporary support, a known resin film is used without particular limitation, and a film, which has flexibility and does not significantly deform, shrink, or stretch under pressure or under pressure and heat, can be suitably used.

As the temporary support, a resin film such as a cycloolefin copolymer film, a polyethylene terephthalate (PET) film, a triacetate cellulose film, a polystyrene film, a polycarbonate film, and a polymethylmethacrylate film is preferable, and a polyethylene terephthalate film is more preferable.

In addition, from the viewpoint that peelability of the temporary support from the colored layer is excellent, an organic film with a peeling layer is more preferable.

Examples of a commercially available product of the temporary support include a PET film with a peeling layer, such as "Unipeel (registered trademark)" series (manufactured by UNITIKA LTD.) and "Cerapeel (registered trademark)" series (manufactured by TORAY ADVANCED FILM CO., LTD.).

—TOTAL LIGHT TRANSMITTANCE—

In a case of performing exposure from the temporary support side in the exposure step described later, the total light transmittance of the temporary support used in the present disclosure is preferably 80% or more and more preferably 90% or more.

The total light transmittance can be measured by a spectrophotometer (for example, spectrophotometer UV-2100 manufactured by Shimadzu Corporation).

[Peeling Layer]

In order to improve peelability from the colored layer, the temporary support preferably has a peeling layer.

In addition, in order to improve peelability between the temporary support and the colored layer, the decorative film according to the embodiment of the present disclosure preferably has a peeling layer between the temporary support and the colored layer.

Furthermore, in a case where the decorative film according to the embodiment of the present disclosure has the peeling layer, it is preferable to be peeled off between the temporary support and the peeling layer. In a case of being peeled off between the temporary support and the peeling layer, it is possible to suppress the occurrence of defective lamination starting from a portion formed of a concave portion due to unevenness and the like of the colored layer in a case of peeling off the temporary support.

The peeling layer is not particularly limited, and a known peeling layer in the field of transfer film and the like can be used.

Examples of the peeling layer include a layer including a thermoplastic resin, a thermoplastic resin layer described in paragraph 0026 of JP4502784B is suitably used as the peeling layer.

In a case where the temporary support has the peeling layer, in the step of forming the colored layer, it is preferable that the colored layer is formed on the peeling layer.

[Colored Layer]

The decorative film according to the embodiment of the present disclosure has a colored layer, in which the decorative film is a film for viewing the colored layer through the cholesteric liquid crystal layer.

The color of the colored layer is not particularly limited and it is sufficient that the colored layer is a colored (not colorless and transparent) layer, but an opaque colored layer (preferably a colored layer having a total light transmittance of 10% or less) is preferable.

In addition, it is sufficient that the colored layer has various colors such as black, gray, white, red, orange, yellow, green, blue, and violet, but a black-colored layer is preferable from the viewpoint that the intensity of the reflected light is low and the change in color is more emphasized. For example, even in a case where the colored layer is black, by appropriately selecting the cholesteric liquid crystal layer, the color is changed from black. Furthermore, it is possible to obtain a decorative film in which, even in a case of viewing from any angle on the film surface on the cholesteric liquid crystal layer side, a color different from the color of the colored layer itself is viewed and the color changes depending on the angle.

In addition, the colored layer may be a layer formed by curing a polymerizable compound, or may be a layer including a polymerizable compound and a polymerization initiator, but from the viewpoint of storability and adhesiveness between the colored layer and other layers, is preferably a layer formed by curing a polymerizable compound and more preferably a layer formed by curing at least a bifunctional or trifunctional polymerizable compound which has at least one partial structure selected from the group consisting of a urethane bond and an alkyleneoxy group having 2 or 3 carbon atoms.

—Colorant—

The colored layer preferably includes a colorant from the viewpoint of visibility, and more preferably includes a pigment as the colorant from the viewpoint of durability.

The colorant is not particularly limited, and a colorant having a target color tone can be appropriately selected and used.

Examples of the colorant include a pigment and a dye, and a pigment is preferable.

In addition, the pigment is preferably a pigment having a particle shape.

As the pigment, various inorganic pigments or organic pigments known in the related art can be used.

Examples of the inorganic pigment include inorganic pigments described in paragraph 0015 and paragraph 0114 of JP2005-007765A.

Specific examples of the inorganic pigment include white pigments such as titanium dioxide, zinc oxide, lithopone, light calcium carbonate, white carbon, aluminum oxide, aluminum hydroxide, and barium sulfate, and black pigments such as carbon black, titanium black, titanium carbon, iron oxide, and graphite.

For example, known chromatic pigments such as iron oxide, barium yellow, cadmium red, and chrome yellow can also be used.

Examples of the organic pigment include organic pigments described in paragraph 0093 of JP2009-256572A.

Specific examples of the organic pigment include red pigments such as C. I. Pigment Red 177, 179, 224, 242, 254, 255, and 264, yellow pigments such as C. I. Pigment Yellow 138, 139, 150, 180, and 185, orange pigments such as C. I. Pigment Orange 36, 38, and 71, green pigments such as C. I. Pigment Green 7, 36, and 58, blue pigments such as C. I. Pigment Blue 15:6, and violet pigments such as C. I. Pigment Violet 23.

In addition, as the pigment, particles of a pigment (so-called bright pigment) having a light-transmitting property and light-reflecting property may be included.

In a case of including the exposure step described later, the bright pigment is preferably used in a range that does not hinder the curing by exposure.

The colorant may be used singly or two or more kinds thereof may be used in combination. In addition, particles of the inorganic pigment and particles of the organic pigment may be used in combination.

From the viewpoint of developing the target color tone (for example, suppressing whitening) and maintaining shape-following property of the colored layer to the mold, the content of the colorant in the colored layer is preferably 1% by mass to 50% by mass, more preferably 5% by mass to 50% by mass, and still more preferably 10% by mass to 40% by mass with respect to the total mass of the colored layer.

Here, the "whitening" in the present disclosure means that the colored layer changes so as to exhibit a whitish tint with a matt tone.

—Polymerizable Compound—

The colored layer used in the present disclosure preferably includes a polymerizable compound.

Examples of a polymerizable group include an ethylenically unsaturated group and an epoxy group, and from the viewpoint of curability, an ethylenically unsaturated group is preferable and a (meth)acryloxy group is more preferable.

In addition, as the polymerizable group, a radical polymerizable group is preferable.

As the polymerizable compound, a bifunctional or trifunctional polymerizable compound (hereinafter, also referred to as a "specific polymerizable compound") having at least one partial structure selected from the group consisting of a urethane bond, a urea bond, an alkyleneoxy group having 2 or 3 carbon atoms, and a hydrocarbon group having 6 to 12 carbon atoms is preferable, a bifunctional or trifunctional polymerizable compound having at least one partial structure selected from the group consisting of a urethane bond and an alkylene oxide group having 2 or 3 carbon atoms is more preferable.

The specific polymerizable compound may have a linking group between the partial structure and the polymerizable group as necessary. In addition, the specific polymerizable compound may have two or more partial structures selected from the group consisting of a urethane bond, a urea bond, an alkyleneoxy group having 2 or 3 carbon atoms, and a hydrocarbon group having 6 to 12 carbon atoms.

<Bifunctional or Trifunctional Polymerizable Compound Having Urethane Bond>

As the bifunctional or trifunctional polymerizable compound (hereinafter, also referred to as a "specific polymerizable compound 1") having a urethane bond, a urethane oligomer is preferable.

A nitrogen atom in the urethane bond may be two-substituted (one of the groups on the nitrogen atom is a hydrogen atom) or three-substituted.

In addition, the specific polymerizable compound 1 preferably has a urethane resin chain.

As the urethane oligomer, a urethane (meth)acrylate oligomer is preferable, and examples thereof include an aliphatic urethane (meth)acrylate and an aromatic urethane (meth)acrylate.

For details, the reference can be made to Oligomer Handbook (edited by Junji Furukawa, The Chemical Daily Co., Ltd.), and the urethane oligomer described therein can be appropriately selected according to the purpose and used for forming the colored layer in the step.

The molecular weight of the urethane oligomer as the specific polymerizable compound 1 is preferably 800 to 2,000 and more preferably 1,000 to 2,000.

As the urethane (meth)acrylate oligomer as the specific polymerizable compound 1, a commercially available product may be used.

Examples of the commercially available product of the urethane (meth)acrylate oligomer include U-2PPA, UA-122P, and the like manufactured by Shin-Nakamura Chemical Co., Ltd.; CN964A85, CN964, CN959, CN962, CN963J85, CN965, CN982B88, CN981, CN983, CN991, CN991NS, CN996, CN996NS, CN9002, CN9007, CN9178, CN9893, and the like manufactured by Sartomer Japan Inc.; and EBECRYL230, EBECRYL270, EBECRYL284, EBECRYL4858, EBECRYL210, EBECRYL8402, EBECRYL8804, EBECRYL8800-20R, and the like manufactured by DAICEL-ALLNEX LTD. (above, product name). Note that, "EBECRYL" is a registered trademark.

<Bifunctional or Trifunctional Polymerizable Compound Having Urea Bond>

Examples of the bifunctional or trifunctional polymerizable compound (hereinafter, also referred to as a "specific polymerizable compound 2") having a urea bond include a bifunctional or trifunctional ethylenically unsaturated compound having a urea bond.

A nitrogen atom in the urea bond may be two-substituted (one of the groups on the nitrogen atom is a hydrogen atom) or three-substituted.

In addition, the specific polymerizable compound 2 preferably has a urea resin chain.

Specific examples of the bifunctional or trifunctional ethylenically unsaturated compound having a urea bond include a synthetic product obtained by reacting an isocyanate compound having an ethylenically unsaturated group with an amine compound.

Examples of the isocyanate compound having an ethylenically unsaturated group include 2-methacryloyloxyethyl isocyanate (as a commercially available product, Karenz MOI (registered trademark) manufactured by SHOWA DENKO K.K.), a compound in which an isocyanate group of 2-methacryloyloxyethyl isocyanate is blocked with methyl ethyl ketone oxime (methacrylic acid 2-(O-[1'-methylpropylideneamino]carboyxamino; as a commercially available product, Karenz MOI-BM (registered trademark) manufactured by SHOWA DENKO K.K.), and a compound an isocyanate group of 2-methacryloyloxyethyl isocyanate is blocked with pyrazole (2-[(3,5-dimethylpyrazolyl)carbonylamino]ethyl methacrylate; as a commercially available product, Karenz MOI-BP (registered trademark) manufactured by SHOWA DENKO K.K.).

In addition, as the amine compound, for example, an amine compound having two or more active hydrogen atoms, specifically, dimethylamine, trimethylamine, triethylamine, diisopropylamine, diethylenetriamine, triethylenetetramine, and the like can be used.

The specific polymerizable compound 2 is not limited to those obtained by this method.

Specific examples of the specific polymerizable compound 2 include ethoxylated isocyanuric acid diacrylate, ethoxylated isocyanuric acid triacrylate, and ε-caprolactone-modified tris(2-acryloxyethyl) isocyanurate.

Here, ethoxylated isocyanuric acid diacrylate, ethoxylated isocyanuric acid triacrylate, and ε-caprolactone-modified tris(2-acryloxyethyl) isocyanurate are also a compound having an ethyleneoxy group.

The specific polymerizable compound 2 is available as a commercially available product.

Specific examples of the commercially available product include NK ESTER A-9300 and A-9300-1CL manufactured by Shin-Nakamura Chemical Co., Ltd.; and ARONIX (registered trademark) M-215, 313, and 315 manufactured by TOAGOSEI CO., LTD. (above, product name).

<Bifunctional or Trifunctional Polymerizable Compound Having Alkyleneoxy Group Having 2 or 3 Carbon Atoms>

The bifunctional or trifunctional polymerizable compound (hereinafter, also referred to as a "specific polymerizable compound 3") having an alkyleneoxy group (also referred to as an "alkylene oxide group") having 2 or 3 carbon atoms has, for example, one or more ethyleneoxy groups or propyleneoxy groups and two or three polymerizable groups at a molecular terminal in one molecule.

Examples of the propyleneoxy group include —$CH_2$—$CH_2$—$CH_2$—O—, $CH_2$—$CH(CH_3)$O—, and —$CH(CH_3)$—$CH_2$O—, —$CH_2$—$CH(CH_3)$O— or —$CH(CH_3)$—$CH_2$O— is preferable.

Here, examples of the polymerizable group in the specific polymerizable compound 3 include at least one ethylenically unsaturated group selected from the group consisting of an acryloyloxy group, an acryloyl group, a methacryloyloxy group, and a methacryloyl group.

Specific examples of the specific polymerizable compound 3 include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerin triacrylate, and ethoxylated glycerin trimethacrylate.

From the viewpoint of improving shape-following property to the mold, the number of ethyleneoxy groups or propyleneoxy groups included in these compounds is preferably 3 or more, more preferably 9 to 40, and particularly preferably 15 to 30.

In addition, from the viewpoint of further improving shape-following property to the mold, the specific polymerizable compound 3 preferably has a polyethyleneoxy group or polypropyleneoxy group having two or more ethyleneoxy groups or propyleneoxy groups repeatedly. The repeated number of ethyleneoxy groups or propyleneoxy groups in the polyethyleneoxy group or the polypropyleneoxy group is preferably 3 or more and particularly preferably 5 or more.

The specific polymerizable compound 3 is available as a commercially available product.

Specific examples of the commercially available product include NK ESTER A-200, A-400, A-600, A-1000, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, and A-TMPT-9EO manufactured by Shin-Nakamura Chemical Co., Ltd.; PEG400DA manufactured by Nippon Kayaku Co., Ltd.; ARONIX (registered trademark) M-220 and M-350 manufactured by TOAGOSEI CO., LTD.; and SR415, SR454, and SR9035 manufactured by Sartomer Japan Inc. (above, product name).

<Bifunctional or Trifunctional Polymerizable Compound Having Hydrocarbon Group Having 6 to 12 Carbon Atoms>

The bifunctional or trifunctional polymerizable compound (hereinafter, also referred to as a "specific polymerizable compound 4") having a hydrocarbon group having 6 to 12 carbon atoms has 6 to 12 carbon atoms, and has a linear, cyclic, or branched hydrocarbon group and two or three polymerizable groups.

Here, the hydrocarbon group in the specific polymerizable compound 4 is specifically a hydrocarbon group having 6 to 12 carbon atoms, which may be linear or branched.

Among these, from the viewpoint of improving shape-following property to the mold, the hydrocarbon group is preferably linear.

In addition, examples of the polymerizable group include at least one ethylenically unsaturated group selected from the group consisting of an acryloyloxy group, an acryloyl group, a methacryloyloxy group, and a methacryloyl group.

Specific examples of the specific polymerizable compound 4 include 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,4-cyclohexanediol di(meth)acrylate, tricyclodecane dimethanol di(meth)acrylate, hydrogenated bisphenol A di(meth)acrylate, and hydrogenated bisphenol F di(meth)acrylate.

Among these compounds, tricyclodecane dimethanol di(meth)acrylate, 1,6-hexanediol di(meth)acrylate, 1,9-nonanediol di(meth)acrylate, 1,10-decanediol di(meth)acrylate, and neopentyl glycol di(meth)acrylate are preferably used.

As the polymerizable compound, from the viewpoint of improving three-dimensional moldability by, for example, increasing flexibility in a case of heating, a bifunctional or trifunctional polymerizable compound having at least one partial structure selected from the group consisting of a urethane bond and an alkylene oxide group having 2 or 3 carbon atoms is preferable.

The colored layer may contain other polymerizable compounds in addition to the specific polymerizable compound.

As the other polymerizable compounds, any compound including the same polymerizable group as that of the specific polymerizable compound can be used without particular limitation.

From the viewpoint of improving interlaminar adhesion and imparting flexibility to the colored layer, the content of the polymerizable compound is preferably 10% by mass to 50% by mass and still more preferably 20% by mass to 40% by mass with respect to the total mass of uncured colored layer.

Each of the specific polymerizable compound and the other polymerizable compounds may be used singly or two or more kinds thereof may be used in combination.

The molecular weight (in a case of having a molecular weight distribution, weight-average molecular weight) of the respective polymerizable compounds used in the present disclosure is preferably 200 to 3,000, more preferably 250 to 2,600, and particularly preferably 280 to 2,200.

—Dispersant—

From the viewpoint of improving dispersibility of the pigment included in the colored layer, the colored layer may contain a dispersant.

By containing the dispersant, dispersibility of the pigment in the formed colored layer is improved, and the color tone of the decorative film to be obtained can be uniformized.

The dispersant can be appropriately selected and used according to the type and shape of the pigment, but is preferably a polymer dispersant.

Examples of the polymer dispersant include silicone polymers, acrylic polymers, and polyester polymers.

In a case where it is desired to impart heat resistance to the decorative film, silicone polymers such as a graft type silicone polymer are suitably used as the dispersant.

The weight-average molecular weight of the dispersant is preferably 1,000 to 5,000,000, more preferably 2,000 to 3,000,000, and particularly preferably 2,500 to 3,000,000. In a case where the weight-average molecular weight is 1,000 or more, dispersibility of the pigment is further improved.

As the dispersant, a commercially available product may be used. Examples of the commercially available product include EFKA 4300 (acrylic polymer dispersant) manufactured by BASF Japan; HOMOGENOL L-18, HOMOGENOL L-95, and HOMOGENOL L-100 manufactured by Kao Corporation; Solsperse 20000 and Solsperse 24000 manufactured by Lubrizol Corporation; and DISPERBYK-110, DISPERBYK-164, DISPERBYK-180, and DISPERBYK-182 manufactured by BYK Chemie Japan.

Note that, "HOMOGENOL", "Solsperse", and "DISPERBYK" are all registered trademarks.

In a case where the colored layer contains the dispersant, the colored layer may contain only one or two or more kinds of dispersants.

The content of the dispersant is preferably 1 part by mass to 30 parts by mass with respect to 100 parts by mass of the colorant.

—Polymerization Initiator—

In order to increase curing sensitivity and further improve interlaminar adhesion, the colored layer preferably contains a polymerization initiator, and more preferably contains the polymerizable compound and a polymerization initiator.

From the viewpoint of increasing sensitivity to exposure, the polymerization initiator is preferably a photopolymerization initiator.

As the photopolymerization initiator, polymerization initiators described in paragraphs 0031 to 0042 of JP2011-

095716A and oxime-based polymerization initiators described in paragraphs 0064 to 0081 of JP2015-014783A.

Specific examples of the photopolymerization initiator include 1-[4-(phenylthio)]-1,2-octanedione-2-(O-benzoyloxime) (for example, IRGACURE (registered trademark) OXE-01 manufactured by BASF), [9-ethyl-6-(2-methylbenzoyl)-9H-carbazol-3-yl]ethan-1-one-1-(O-acetyloxime) (for example, IRGACURE (registered trademark) OXE-02 manufactured by BASF), 2-(dimethylamino)-2-[(4-methylphenyl)methyl]-1-[4-(4-morpholinyl)phenyl]-1-butanone (for example, IRGACURE (registered trademark) 379EG manufactured by BASF), 2-methyl-1-(4-methylthiophenyl)-2-morpholinopropan-1-one (for example, IRGACURE (registered trademark) 907 manufactured by BASF), 2-hydroxy-1-{4-[4-(2-hydroxy-2-methylpropionyl)benzyl]phenyl}-2-methyl-propan-1-one (for example, IRGACURE (registered trademark) 127 manufactured by BASF), 2-benzyl-2-dimethylamino-1-(4-morpholinophenyl)butanone-1 (for example, IRGACURE (registered trademark) 369 manufactured by BASF), 2-hydroxy-2-methyl-1-phenylpropan-1-one (for example, IRGACURE (registered trademark) 1173 manufactured by BASF), 1-hydroxycyclohexyl phenyl ketone (for example, IRGACURE (registered trademark) 184 manufactured by BASF), 2,2-dimethoxy-1,2-diphenylethan-1-one (for example, IRGACURE (registered trademark) 651 manufactured by BASF), product name: Lunar 6 which is an oxime ester-based polymerization initiator (manufactured by DKSH Japan), 2,4-diethylthioxanthone (for example, KAYACURE DETX-S manufactured by Nippon Kayaku Co., Ltd.), and DFI-091 and DFI-020 which are fluorene oxime-based polymerization initiator (both manufactured by DAITO CHEMIX Co., Ltd.).

Among these, from the viewpoint of increasing curing sensitivity, an initiator other than a halogen-containing polymerization initiator, such as a trichloromethyltriazine-based compound, is preferably used, and oxime-based polymerization initiators such as an α-aminoalkylphenone-based compound, an α-hydroxyalkylphenone-based compound, and an oxime ester-based compound are more preferable.

The content of the polymerization initiator is preferably 0.1 parts by mass to 15 parts by mass and more preferably 0.5 parts by mass to 10 parts by mass with respect to 100 parts by mass of the polymerizable compound.

—Binder Resin—

From the viewpoint of reducing curing shrinkage of the colored layer, the colored layer preferably contains a binder resin.

The binder resin is not particularly limited, and a known resin can be appropriately selected. From the viewpoint of obtaining a target color tone, as the binder resin, a transparent resin is preferable, and specifically, a resin having a total light transmittance of 80% or more is preferable.

The total light transmittance can be measured by a spectrophotometer (for example, spectrophotometer UV-2100 manufactured by Shimadzu Corporation).

Examples of the binder resin include acrylic resins, silicone resins, polyester resins, urethane resins, and olefin resins.

Among these, from the viewpoint of transparency, acrylic resins, silicone resins, or polyester resins are preferable, and acrylic resins or silicone resins are more preferable. Furthermore, from the viewpoint of heat resistance, silicone resins are preferable.

The "acrylic resin" in the present disclosure means a resin including a constitutional unit derived from an acrylic monomer having a (meth)acryloyl group. The (meth)acryloyl group is a concept including a methacryloyl group and an acryloyl group.

The acrylic resin includes, for example, an acrylic acid homopolymer, a methacrylic acid homopolymer, an acrylic acid ester homopolymer, a methacrylic acid ester homopolymer, a copolymer of acrylic acid and other monomers, a copolymer of methacrylic acid and other monomers, a copolymer of acrylic acid ester and other monomers, a copolymer of methacrylic acid ester and other monomers, a urethane-modified copolymer having a urethane skeleton in the side chain, and the like.

Examples of the acrylic resin include a glycidyl methacrylate adduct of a cyclohexyl methacrylate/methyl methacrylate/methacrylic acid copolymer, a random copolymer of benzyl methacrylate/methacrylic acid, a copolymer of allyl methacrylate/methacrylic acid, and a copolymer of benzyl methacrylate/methacrylic acid/hydroxyethyl methacrylate.

As the silicone resin, a known silicone resin can be used, and examples thereof include methyl-based straight silicone resins, methylphenyl-based straight silicone resins, acrylic resin-modified silicone resins, ester resin-modified silicone resins, epoxy resin-modified silicone resins, and alkyd resin-modified silicone resins, and rubber-based silicone resins.

Among these, methyl-based straight silicone resins, methylphenyl-based straight silicone resins, acrylic resin-modified silicone resins, or rubber-based silicone resins are preferable, and methyl-based straight silicone resins, methylphenyl-based straight silicone resins, or rubber-based silicone resins are more preferable.

As the silicone resin, a commercially available product may be used, and examples of the commercially available product include KR-300, KR-311, KR-251, X-40-2406M, and KR-282 manufactured by Shin-Etsu Chemical Co., Ltd.

Examples of the polyester resin include a linear saturated polyester synthesized from aromatic dibasic acid or an ester-forming derivative thereof, and diol or an ester-forming derivative thereof.

Specific examples of the linear saturated polyester include polyethylene terephthalate, polyethylene isophthalate, polybutylene terephthalate, poly(1,4-cyclohexylene dimethylene terephthalate), and polyethylene-2,6-naphthalate.

From the viewpoint of reducing curing shrinkage of the colored layer, the content of the binder resin is preferably 5% by mass to 70% by mass, more preferably 10% by mass to 60% by mass, and still more preferably 20% by mass to 60% by mass with respect to the total mass of the colored layer.

In addition, the ratio of the total of the binder resin to the total amount of the polymerizable compound including the specific polymerizable compound, that is, the total amount of the polymerizable compound/the total amount of the binder resin is preferably 0.3 to 1.5 and more preferably 0.5 to 1.0.

—Other Components—

The colored layer may contain additives as necessary, in addition to the above-described components.

As the additive, a known additive can be used, and examples thereof include surfactants described in paragraph 0017 of JP4502784B and paragraphs 0060 to 0071 of JP2009-237362A, thermal polymerization inhibitor described in paragraph 0018 of JP4502784B (also referred to as a polymerization inhibitor; preferably phenothiazine), and other additives described in paragraphs 0058 to 0071 of JP2000-310706.

—Formation of Colored Layer—

The method for forming the colored layer is not particularly limited, but it is preferable that the colored layer is formed using a composition for forming the colored layer.

The composition for forming the colored layer contains the colorant, and preferably contains the colorant and an organic solvent.

In addition, the composition for forming the colored layer may further contain the above-described other components.

The composition for forming the colored layer can be prepared, for example, by mixing an organic solvent, and components contained in the colored layer, such as the colorant.

The content of the components contained in the colored layer is described as the content (% by mass) with respect to the total mass of the colored layer, but in a case where these components are contained in the composition for forming the colored layer, the content thereof may be considered as the content (% by mass) with respect to the total solid content of the composition for forming the colored layer.

In addition, in a case where the composition for forming the colored layer contains a pigment as the colorant, from the viewpoint of enhancing uniform dispersibility and dispersion stability of the pigment, it is preferable that a pigment dispersion liquid containing the pigment and a dispersant therefor is prepared in advance and the composition for forming the colored layer is prepared using the pigment dispersion liquid.

As the composition for forming the colored layer, a composition prepared in advance by the above-described method may be used, a commercially available product or the like may be used, or a composition for forming the colored layer may be prepared immediately before coating.

<Organic Solvent>

As the organic solvent, a generally used organic solvent can be used without particular limitation. Specific examples thereof include organic solvents such as esters, ethers, ketones, and aromatic hydrocarbons.

In addition, as the organic solvent in the composition for forming the colored layer, methyl ethyl ketone, propylene glycol monomethyl ether, propylene glycol monomethyl ether acetate, cyclohexanone, cyclohexanol, methyl isobutyl ketone, ethyl lactate, methyl lactate, and the like, which are the same as Solvent described in paragraphs 0054 and 0055 of US2005/282073A, can also be suitably used.

Among these, as the organic solvent in the composition for forming the colored layer, 1-methoxy-2-propyl acetate, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, diethylene glycol monoethyl ether acetate (ethyl carbitol acetate), diethylene glycol monobutyl ether acetate (butyl carbitol acetate), propylene glycol methyl ether acetate, methyl ethyl ketone, and the like are preferably used.

These organic solvents may be used singly or in combination of two or more kinds thereof.

In addition, the content of the organic solvent is not particularly limited, but is preferably 5% by mass to 90% by mass and more preferably 30% by mass to 70% by mass with respect to the total mass of the composition for forming the colored layer (coating solution).

[Cholesteric Liquid Crystal Layer]

The decorative film according to the embodiment of the present disclosure has a cholesteric liquid crystal layer, in which the decorative film is a film for viewing the colored layer through the cholesteric liquid crystal layer.

In the decorative film according to the embodiment of the present disclosure, by changing at least one selected from the group consisting of the pitch of a helical structure, refractive index, and thickness of the cholesteric liquid crystal layer, it is possible to adjust the change in color depending on the viewed angle, and the viewed color itself. The pitch of the helical structure can be easily adjusted by changing the addition amount of a chiral agent. More specifically, detailed description can be found in FUJIFILM Research Report No. 50 (2005), pp. 60 to 63. In addition, the pitch of the helical structure can also be adjusted by conditions such as temperature, illuminance, and irradiation time in a case of fixing cholesteric alignment state.

As the cholesteric liquid crystal layer, a liquid crystal compound fixed in a cholesteric alignment state is preferable. The cholesteric alignment state may be an alignment state reflecting right-handed circular polarization, may be an alignment state reflecting left-handed circular polarization, or may include both alignment states. The liquid crystal compound is not particularly limited, and various known compounds can be used.

The liquid crystal compound used in the present disclosure is not particularly limited, and a known liquid crystal compound can be used.

Among these, from the viewpoint of strength and wiping resistance, the liquid crystal compound is preferably a liquid crystalline polymer compound, and the cholesteric liquid crystal layer is preferably a layer formed by polymerizing at least a polymerizable liquid crystal compound, and more preferably a layer formed by polymerizing a polymerizable liquid crystal composition.

The polymerizable liquid crystal composition for forming the cholesteric liquid crystal layer may contain, for example, a rod-like liquid crystal compound or a discotic liquid crystal compound and may further contain other components such as a chiral agent, an alignment control agent, a polymerization initiator, and an alignment assistant.

—Rod-Like Liquid Crystal Compound—

As the rod-like liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, or alkenylcyclohexylbenzonitriles are preferably used. In addition to the above-described low-molecular weight liquid crystal compounds, a liquid crystalline polymer compound can also be used.

The cholesteric liquid crystal layer is more preferably a layer in which the alignment is fixed by polymerizing a rod-like liquid crystal compound.

As the polymerizable rod-like liquid crystal compound, compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO1995/022586A, WO1995/024455A, WO1997/000600A, WO1998/023580A, WO1998/052905A, JP1989-272551A (JP-H01-272551A), JP1994-016616A (JP-H06-016616A), JP1995-110469A (JP-H07-110469A), JP1999-080081A (JP-H11-080081A), JP2001-328973A, and the like can be used. Furthermore, as the rod-like liquid crystal compound, for example, compounds described in JP1999-513019A (JP-H11-513019A) and JP2007-279688A can also be preferably used.

—Discotic Liquid Crystal Compound—

As the discotic liquid crystal compound, for example, compounds described in JP2007-108732A and JP2010-244038A can be preferably used.

Preferred examples of the discotic liquid crystal compound are shown below, but the present disclosure is not limited thereto.

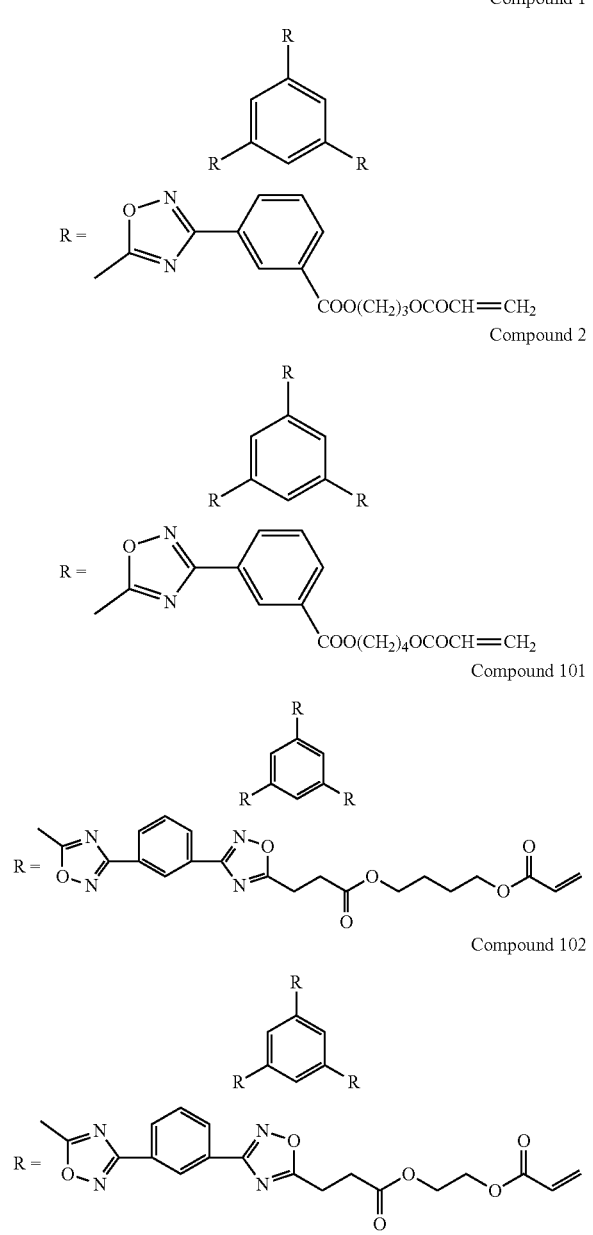

Compound 1

Compound 2

Compound 101

Compound 102

—Other Components—

In addition to the above-described liquid crystal compound, the composition used for forming the cholesteric liquid crystal layer may contain may contain other components such as a chiral agent, an alignment control agent, a polymerization initiator, and an alignment assistant. Any known material can be used as the other components.

—Solvent—

As a solvent of the composition for forming the cholesteric liquid crystal layer, an organic solvent is preferably used. Examples of the organic solvent include amide compounds (for example, N,N-dimethylformamide), sulfoxide compounds (for example, dimethylsulfoxide), heterocyclic compounds (for example, pyridine), hydrocarbon compounds (for example, benzene and hexane), alkyl halide compounds (for example, chloroform and dichloromethane), ester compounds (for example, methyl acetate and butyl acetate), ketone compounds (for example, acetone, methyl ethyl ketone, and cyclohexanone), and ether compounds (for example, tetrahydrofuran and 1,2-dimethoxyethane). Among these, at least one solvent selected from the group consisting of alkyl halide compounds and ketone compounds is preferable. Two or more kinds of organic solvents may be used in combination.

—Coating and Curing of Polymerizable Liquid Crystal Composition—

The coating of the polymerizable liquid crystal composition can be performed by a method of developing the polymerizable liquid crystal composition in a solution state with the solvent or in a liquid state, such as a molten liquid by heating, according to an appropriate method such as a roll coating method, a gravure printing method, and a spin coating method. Furthermore, the coating of the polymerizable liquid crystal can be performed according to various methods such as a wire bar coating method, an extrusion coating method, a direct gravure coating method, a reverse gravure coating method, and a die-coating method. In addition, using an inkjet device, the liquid crystal composition can be discharged from a nozzle to form a coating film.

Thereafter, by curing the polymerizable liquid crystal composition, the alignment state of molecules of the liquid crystal compound is maintained and fixed. The curing is preferably performed by a polymerization reaction of the polymerizable group introduced into the liquid crystal compound.

After the coating of the polymerizable liquid crystal composition and before the polymerization reaction for curing, the coating film may be dried by a known method. For example, the coating film may be dried by allowing to stand or by heating.

It is sufficient that, in the steps of coating and drying the polymerizable liquid crystal composition, the liquid crystal compound molecules in the polymerizable liquid crystal composition are aligned.

—Alignment Layer—

The decorative film according to the embodiment of the present disclosure may have an alignment layer which is in contact with the above-described cholesteric liquid crystal layer. The alignment layer is used for aligning the molecules of the liquid crystal compound in the composition for forming the liquid crystal layer in a case of forming a layer including the liquid crystal compound.

The alignment layer is used in a case of forming a layer such as the liquid crystal layer, and the decorative film may or may not include the alignment layer.

The alignment layer can be provided by a method of a rubbing treatment of an organic compound (preferably a polymer), an oblique vapor deposition of an inorganic compound such as SiO, a formation of a layer having a microgroove, and the like. Furthermore, an alignment layer in which an alignment function occurs by application of an electric field, application of a magnetic field, or light irradiation has also been known.

Depending on the material of an underlayer such as a support and a liquid crystal layer, the alignment layer may be provided, or the underlayer may be subjected to a direct alignment treatment (for example, rubbing treatment) to function as an alignment layer. Polyethylene terephthalate (PET) can be mentioned as an example of such a support as the underlayer.

In addition, in a case where a layer is directly laminated on the liquid crystal layer, in some cases, the liquid crystal layer as the underlayer behaves as the alignment layer and the liquid crystal compound for forming an upper layer can be aligned. In such a case, the liquid crystal compound in the upper layer can be aligned without providing the alignment layer or performing a special alignment treatment (for example, rubbing treatment).

Hereinafter, as a preferred example, a rubbing-treated alignment layer which is used by subjecting a surface to a rubbing treatment, and a photo alignment layer will be described.

~Rubbing-Treated Alignment Layer~

Examples of a polymer which can be used in the rubbing-treated alignment layer include a methacrylate-based copolymer, a styrene-based copolymer, polyolefin, polyvinyl alcohol and modified polyvinyl alcohol, poly(N-methylol acrylamide), polyester, polyimide, a vinyl acetate copolymer, carboxymethyl cellulose, and polycarbonate, which are described in paragraph 0022 of JP1996-338913A (JP-H08-338913A). A silane coupling agent can be used as the polymer. A water-soluble polymer (for example, poly(N-methylol acrylamide), carboxymethyl cellulose, gelatin, polyvinyl alcohol, and modified polyvinyl alcohol) is preferable, gelatin, polyvinyl alcohol, or modified polyvinyl alcohol is more preferable, and polyvinyl alcohol or modified polyvinyl alcohol is particularly preferable.

The molecules of the liquid crystal compound are aligned by coating a rubbing-treated surface of the alignment layer with the above-described composition for forming the cholesteric liquid crystal layer. Thereafter, as necessary, by reacting the alignment layer polymer with a polyfunctional monomer contained in the cholesteric liquid crystal layer, or by crosslinking the alignment layer polymer using a cross-linking agent, the cholesteric liquid crystal layer can be formed.

The thickness of the alignment layer is preferably in a range of 0.01 μm to 10 μm.

~Rubbing Treatment~

The surface of the alignment layer, the support, or other layers, to be coated with the above-described composition for forming the cholesteric liquid crystal layer, may be subjected to a rubbing treatment as necessary. The rubbing treatment can be generally performed by rubbing a surface of a film containing a polymer as a main component with paper or cloth in a certain direction. The general method of the rubbing treatment is described in, for example, "Handbook of Liquid crystals" (published by Maruzen, Oct. 30, 2000).

As a method of changing a rubbing density, the method described in "Handbook of Liquid crystals" (published by Maruzen) can be used. The rubbing density (L) is quantified by Expression (A).

$$L = NI(1 + 2\pi rn/60v)$$ Expression (A)

In Expression (A), N is the number of times of rubbing, I is a contact length of a rubbing roller, r is a radius of the roller, n is a rotation speed (rpm) of the roller, and v is a stage moving speed (speed per second).

In order to increase the rubbing density, it is sufficient that the number of times of rubbing is increased, the contact length of the rubbing roller is increased, the radius of the roller is increased, the rotation speed of the roller is increased, or the stage moving speed is decreased. On the other hand, in order to decrease the rubbing density, it is sufficient that the reverse is carried out. In addition, with regard to conditions of the rubbing treatment, the description in JP4052558B can be referred to.

~Photo Alignment Layer~

A photo alignment material used for the photo alignment layer formed by light irradiation is described in many references. Preferred examples thereof include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo alignment unit, described in JP2002-265541A and JP2002-317013A; photo-crosslinkable silane derivatives described in JP4205195B and JP4205198B; and photo-crosslinkable polyimides, polyamides, or esters described in JP2003-520878A, JP2004-529220A, and JP4162850B. Azo compounds or photo-crosslinkable polyimides, polyamides, or esters are particularly preferable.

The photo alignment layer is produced by subjecting the photo alignment layer formed of the above-described material to an irradiation of linearly polarized light or non-polarized light.

In the present specification, the "irradiation of linearly polarized light" is an operation for causing a photo-reaction of the photo alignment material. The wavelength of the light used depends on the photo alignment material used, and is not particularly limited as long as a wavelength necessary for the photo-reaction. The peak wavelength of the light used for light irradiation is preferably 200 nm to 700 nm and the light is more preferably UV light having a peak wavelength of 400 nm or less.

Examples of a light source used for light irradiation include commonly used light sources, for example, lamps such as a tungsten lamp, a halogen lamp, a xenon lamp, a xenon flash lamp, a mercury lamp, a mercury-xenon lamp, and a carbon arc lamp, various lasers (such as semiconductor laser, helium neon laser, argon ion laser, helium cadmium laser, and YAG laser), light emitting diodes, cathode ray tube, and the like.

As a method for obtaining the linearly polarized light, a method of using a polarizing plate (for example, iodine polarizing plate, dichroic coloring agent polarizing plate, and wire grid polarizing plate), a method of using a prismatic element (for example, Glan-Thomson prism) or a reflective type polarizer using Brewster's angle, or a method of using light emitted from a polarized laser light source can be adopted. In addition, by using a filter, a wavelength conversion element, or the like, only light having a required wavelength may be irradiated selectively.

In a case where the irradiated light is the linearly polarized light, a method of irradiating, from the upper surface or the back surface, the alignment layer with the light perpendicularly or obliquely to the surface of the alignment layer is adopted. The incidence angle of the light varies depending on the photo alignment material, but is preferably 0° to 90° (perpendicular) and more preferably 40° to 90°.

In a case of using the non-polarized light, the non-polarized light is irradiated obliquely. The incidence angle of the light is preferably 10° to 80°, more preferably 20° to 60°, and particularly preferably 30° to 50°.

The irradiation time is preferably 1 minute to 60 minutes and more preferably 1 minute to 10 minutes.

[Protective Layer]

The decorative film according to the embodiment of the present disclosure has a protective layer.

It is sufficient that the protective layer in the present disclosure is a layer having a sufficient strength to protect the above-described cholesteric liquid crystal layer, but from the viewpoint of visibility and black tightness (suppression of reflection from external light, for example, suppression of reflection of fluorescent lamp), a protective layer having an antireflection function is preferable.

From the viewpoint of strength, visibility, and black tightness, the protective layer preferably contains a resin, more preferably contains at least one resin selected from the group consisting of a siloxane resin, a fluororesin, and a urethane resin, still more preferably contains at least one resin selected from the group consisting of a siloxane resin having voids, a fluororesin, and a urethane resin, and particularly preferably contains a siloxane resin having voids.

In addition, in a case of containing a siloxane resin having voids, or a fluororesin, the refractive index of the protective layer can be 1.5 or less, preferably 1.4 or less, and a protective layer also having excellent antireflection function can be easily obtained.

Specific examples of a material for forming a protective layer having a refractive index of 1.5 or less include a siloxane resin. The refractive index is still more preferably 1.4 or less. Specific examples of a material for forming a layer having a refractive index of 1.4 or less include a siloxane resin having voids, a fluororesin, and low refractive index particles.

The fluororesin is not particularly limited, but examples thereof include resins described in paragraphs 0076 to 0106 of JP2009-217258A and paragraphs 0083 to 0127 of JP2007-229999A.

Examples of the fluororesin include a fluorinated alkyl resin in which a hydrogen atom in olefin is replaced by a fluorine atom, and include polytetrafluoroethylene, polychlorotrifluoroethylene, polyvinylidene fluoride, polyvinyl fluoride, perfluoroalkoxy alkane, a copolymer such as perfluoroethylene propene, ethylene tetrafluoroethylene, and a water-dispersed fluororesin dispersion copolymerized with an emulsifier and a component which enhances affinity with water. Specific examples of such a fluororesin include LUMIFLON and Obbligato manufactured by AGC Inc., ZEFFLE and NEOFLON manufactured by DAIKIN INDUSTRIES, LTD., Teflon manufactured by Dupont, and KYNAR manufactured by ARKEMA.

In addition, for example, a compound having at least one group of polymerizable functional groups and crosslinkable functional groups, and containing a fluorine atom may be used, and examples thereof include radically polymerizable monomers such as perfluoroalkyl (meth)acrylate, a vinyl fluoride monomer, and a vinylidene fluoride monomer, and cationically polymerizable monomers such as perfluorooxetane. Specific examples of such a fluorine compound include LINC3A manufactured by KYOEISHA CHEMICAL CO., LTD, OPTOOL manufactured by DAIKIN INDUSTRIES, LTD., OPSTAR manufactured by Arakawa Chemical Industries, Ltd., and tetrafluorooxetane manufactured by DAIKIN INDUSTRIES, LTD.

The low refractive index particles, preferably particles having a refractive index of 1.45 or less, are not particularly limited, and examples thereof include particles described in paragraphs 0075 to 0103 of JP2009-217258A.

Examples of the low refractive index particles include hollow particles using inorganic oxide particles such as silica or resin particles such as an acrylic resin, porous particles having a porous structure on the particle surface, and fluoride particles with low refractive index of the material itself.

Specific examples of such hollow particles include THRULYA manufactured by JGC C&C, SiliNax manufactured by Nittetsu Mining Co., Ltd., TECHPOLYMER MBX and SBX manufactured by Sekisui Kasei Co., Ltd., and multi-hollow particles, specific examples of the porous particles include Lightstar manufactured by Nissan Chemical Corporation, and specific examples of the fluoride particles include magnesium fluoride nanoparticles manufactured by RMML Co., Ltd.

In addition, in a case where scratch resistance is required for automobile exterior applications and the like, the above-described protective layer preferably contains a urethane resin which is a highly elastic resin.

The resin used for the protective layer is not particularly limited, and a known resin can be used other than the siloxane resin described later.

In addition, the protective layer in the present disclosure more preferably contains a siloxane resin having voids.

The method for forming the siloxane resin having voids is not limited, but from the viewpoint of suppressing deterioration such as thermal deformation of a resin base material and from the viewpoint that it is difficult to form opening as described above on the surface of the protective layer, it is preferable to use a method for forming, by using hollow particles or core-shell particles, closed voids in a matrix composed of the siloxane resin. As a method for forming a protective layer by applying a composition containing hollow particles, for example, a method described in paragraphs 0028 and 0029 of JP2009-103808A, or a method described in paragraphs 0030 and 0031 of JP2008-262187A can be applied. In particular, from the viewpoint of easily adjusting void diameter and void volume, a method for forming a protective layer using core-shell particles is preferable.

Hereinafter, a preferred aspect of the method for forming a protective layer using core-shell particles will be described, but the protective layer in the present disclosure is not limited to the one formed by this forming method.

In the method for forming a protective layer using core-shell particles, a coating solution (hereinafter, also referred to as a "protective layer forming coating solution") containing core-shell particles and a siloxane compound is preferably used.

—Core-Shell Particles—

The protective layer forming coating solution preferably contains core-shell particles.

From the viewpoint of easy formation of closed voids, the core-shell particles include an organic solvent as a core material, and it is particularly preferable that 20% by mass or more of the organic solvent is a non-polar solvent having a boiling point of 90° C. to 350° C.

The "boiling point" in the present disclosure is a boiling point at 1 atm (101,325 Pa). In addition, the "non-polar solvent" in the present disclosure refers to a solvent having a solubility in water at 20° C. of 0.1% by mass or less and having a relative dielectric constant value of 10 or less.

Examples of the non-polar solvent having a boiling point of 90° C. to 350° C. include hydrocarbon compounds, fluorinated hydrocarbon compounds, and silicone compounds, but from the viewpoint of light-transmitting property and haze of the protective layer, hydrocarbon compounds are preferable.

The material of the shell of the core-shell particles is not particularly limited, but from the viewpoint of strength, light-transmitting property, and haze of the protective layer, it is preferable to contain a polysiloxane compound, more preferable to contain a hydrolyzed condensate of a siloxane compound represented by Formula 1 described later, still more preferable to contain 50% by mass or more of the hydrolyzed condensate of a siloxane compound represented by Formula 1 described later, with respect to the total mass of the shell, and particularly preferable that the shell is formed of the hydrolyzed condensate of a siloxane compound represented by Formula 1 described later.

From the viewpoint of strength, light-transmitting property, and haze of the protective layer, the volume average particle diameter of the core-shell particles is preferably 0.05 μm to 1.5 μm, more preferably 0.08 μm to 1.0 μm, still more preferably 0.1 μm to 0.6 μm, and particularly preferably 0.1 μm to 0.4 μm.

In the present disclosure, the volume average particle diameter of particles is measured using a laser diffraction/scattering particle size distribution analyzer (model number: Microtrac MT3300EXII, manufactured by Microtrac BEL Corp.). In the present disclosure, the average particle diameter means a median diameter.

From the viewpoint of strength, light-transmitting property, and haze of the protective layer, the size (maximum diameter) of the core in the core-shell particles is preferably 40 nm or more, more preferably 40 nm to 1,000 nm or more, and particularly preferably 60 nm to 600 nm.

The size (maximum diameter) of the core in core-shell particles can be measured by the same method as the method for measuring the diameter of voids in the protective layer described later.

—Siloxane Compound—

The coating solution for forming the protective layer preferably contains a siloxane compound.

In particular, as the siloxane compound, at least one compound (hereinafter, also referred to as a specific siloxane compound) selected from the group consisting of a siloxane compound represented by Formula 1 and a hydrolyzed condensate of the siloxane compound represented Formula 1 is preferable.

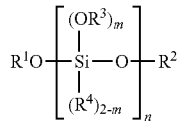

Formula 1

In Formula 1, $R^1$, $R^2$, and $R^3$ each independently represent an alkyl group or alkenyl group having 1 to 6 carbon atoms; in a case of a plurality of $R^4$'s, the plurality of $R^4$'s each independently represent an alkyl group, a vinyl group, or an alkyl group having a group selected from the group consisting of a vinyl group, an epoxy group, a vinylphenyl group, a (meth)acryloxy group, a (meth)acrylamide group, an amino group, an isocyanurate group, a ureido group, a mercapto group, a sulfide group, a polyoxyalkyl group, a carboxy group, and a quaternary ammonium group; m represents an integer of 0 to 2; and n represents an integer of 1 to 20.

The hydrolyzed condensate of the siloxane compound represented Formula 1 refers to a compound obtained by condensing the siloxane compound represented Formula 1, and a compound in which at least one part of substituents on the silicon atom in the siloxane compound represented by Formula 1 is hydrolyzed to form a silanol group.

The alkyl group or alkenyl group having 1 to 6 carbon atoms in $R^1$, $R^2$, and $R^3$ of Formula 1 may be linear, may have a branch, or may have a ring structure. From the viewpoint of strength, light-transmitting property, and haze of the protective layer, the alkyl group or alkenyl group having 1 to 6 carbon atoms is preferably an alkyl group.

Examples of the alkyl group having 1 to 6 carbon atoms include a methyl group, an ethyl group, a propyl group, an isopropyl group, an n-butyl group, a tert-butyl group, an n-pentyl group, an n-hexyl group, and a cyclohexyl group, and a methyl group or an ethyl group is preferable and a methyl group is more preferable.

From the viewpoint of strength, light-transmitting property, and haze of the protective layer, in a case of a plurality of $R^4$'s, the plurality of $R^4$'s in Formula 1 are each independently preferably an alkyl group and more preferably an alkyl group having 1 to 8 carbon atoms.

In addition, $R^4$ in Formula 1 preferably has 1 to 40 carbon atoms, more preferably has 1 to 20 carbon atoms, and particularly preferably 1 to 8 carbon atoms.

From the viewpoint of strength, light-transmitting property, and haze of the protective layer, m in Formula 1 is preferably 1 or 2 and more preferably 2.

From the viewpoint of strength, light-transmitting property, and haze of the protective layer, n in Formula 1 is preferably an integer of 2 to 20.

Examples of the specific siloxane compound include KBE-04, KBE-13, KBE-22, KBE-1003, KBM-303, KBE-403, KBM-1403, KBE-503, KBM-5103, KBE-903, KBE-9103P, KBE-585, KBE-803, KBE-846, KR-500, KR-515, KR-516, KR-517, KR-518, X-12-1135, X-12-1126, and X-12-1131 manufactured by Shin-Etsu Chemical Co., Ltd.; Dynasylan 4150 manufactured by Evonik Japan; MKC Silicate MS51, MS56, MS57, and MS56S manufactured by Mitsubishi Chemical Corporation; and Ethyl Silicate 28, N-Propyl Silicate, N-Butyl Silicate, and SS-101 manufactured by Colcoat Co., Ltd.

—Surfactant—

The coating solution for forming the protective layer preferably contains a surfactant.

Examples of the surfactant include a nonionic surfactant, an anionic surfactant and a cationic surfactant which are an ionic surfactant, and an amphoteric surfactant, and any of these can be suitably used in the present disclosure.

Among these, from the viewpoint of efficiently forming the core-shell particles due to the attractive force interacting with the above-described specific siloxane compound, storage stability, and light-transmitting property and haze of the protective layer, at least one surfactant selected from the group consisting of a nonionic surfactant and a cationic surfactant is preferable and a cationic surfactant is more preferable.

—Other Components—

In addition to the above-described components, the coating solution for forming the protective layer can contain other components depending on the purpose.

As the other components, a known additive can be used, and examples thereof include an antistatic agent, a condensation catalyst of the siloxane compound, and a preservative.

Antistatic Agent

The coating solution for forming the protective layer may contain an antistatic agent.

The antistatic agent is used for the purpose of, by imparting antistatic property to the protective layer, suppressing adhesion of contaminants.

The antistatic agent for imparting antistatic property is not particularly limited.

As the antistatic agent used in the present disclosure, at least one selected from the group consisting of metal oxide particles, metal nanoparticles, conductive polymers, and ionic liquids can be preferably used. The antistatic agent may be used in combination of two or more kinds thereof.

The metal oxide particles need to be added in a relatively large amount in order to provide antistatic property, and since the metal oxide particles are inorganic particles, antifouling property of the protective layer can be further enhanced by containing the metal oxide particles.

The metal oxide particles are not particularly limited, and examples thereof include tin oxide particles, antimony-doped tin oxide particles, tin-doped indium oxide particles, zinc oxide particles, and silica particles.

Since the metal oxide particles have a large refractive index and, in a case where the particle diameter is large, it is concerned that light-transmitting property may be reduced due to scattering of transmitted light, the average primary particle diameter of the metal oxide particles is preferably 100 nm or less, more preferably 50 nm or less, and particularly preferably 30 nm or less. In addition, the lower limit value is preferably 2 nm or more.

In addition, the shape of the particles is not particularly limited, and may be spherical, plate-shaped, or needle-shaped.

The average primary particle diameter of the metal oxide particles can be determined from a photograph obtained by observing dispersed particles using a transmission electron microscope. A projected area of the particles is obtained from an image of the photograph, and an equivalent circle diameter is obtained therefrom and defined as the average particle diameter (average primary particle diameter). As the average primary particle diameter in the present specification, a value calculated by measuring the projected area of 300 or more particles and calculating the equivalent circle diameter is used.

In a case where the shape of the metal oxide particles is not spherical, the average primary particle diameter may be determined using other methods, for example, dynamic light scattering method.

The coating solution for forming the protective layer may contain only one or two or more kinds of antistatic agents. In a case of containing two or more kinds of metal oxide particles, two or more kinds of metal oxide particles having different average primary particle diameters, shapes, and materials may be used.

In the coating solution for forming the protective layer, the content of the antistatic agent is preferably 40% by mass or less, more preferably 30% by mass or less, and particularly preferably 20% by mass or less with respect to the total solid content of the coating solution for forming the protective layer.

By setting the content of the antistatic agent within the above-described range, the antistatic property can be effectively imparted to the protective layer without lowering film forming property of the coating solution for forming the protective layer.

In addition, in a case of using metal oxide particles as the antistatic agent, the content of the metal oxide particles is preferably 30% by mass or less, more preferably 20% by mass or less, and particularly preferably 10% by mass or less with respect to the total mass of the coating solution for forming the protective layer.

By setting the content of the metal oxide particles within the above-described range, dispersibility of the metal oxide particles in the coating solution for forming the protective layer is good, the occurrence of aggregation is suppressed, and the necessary antistatic property can be imparted to the protective layer.

Condensation Catalyst

The coating solution for forming the protective layer preferably contains a condensation catalyst which promotes condensation of the siloxane compound.

In a case where the coating solution for forming the protective layer contains the condensation catalyst, a protective layer having durability can be formed.

—Preparation of Coating Solution for Forming Protective Layer—

The method for preparing the coating solution for forming the protective layer is not particularly limited, and examples thereof include a method for manufacturing a coating solution for forming the protective layer by mixing an organic solvent, a surfactant, and water, dispersing the organic solvent in the water, adding the specific siloxane compound thereto, and partially hydrolyzing and condensing the mixture to form a shell layer on a surface of the organic solvent and to produce core-shell particles, and a method for manufacturing a coating solution for forming the protective layer by mixing core-shell particles containing an organic solvent as a core material, the specific siloxane compound, a surfactant, and water.

—-Formation of Protective Layer—

The above-described coating solution for forming the protective layer is applied onto an underlayer of the protective layer and dried to form the protective layer.

The method of coating the underlayer with the coating solution for forming the protective layer is not particularly limited, and for example, any known coating method such as spray coating, brush coating, roller coating, bar coating, and dip coating can be applied.

In addition, before coating the underlayer with the coating solution for forming the protective layer, the underlayer to be coated with the coating solution for forming the protective layer may be subjected to a surface treatment such as a corona discharge treatment, a glow treatment, an atmospheric plasma treatment, a flame treatment, and an ultraviolet irradiation treatment.

The coating solution for forming the protective layer may be dried at room temperature (25° C.), or may be heated. From the viewpoint that the organic solvent contained in the coating solution for forming the protective layer is sufficiently volatilized to form voids, from the viewpoint of light-transmitting property and suppression of coloration of the protective layer, and from the viewpoint of heating at a temperature below the decomposition temperature of the resin base material, the coating solution for forming the protective layer is preferably heated at 40° C. to 200° C. In addition, from the viewpoint of suppressing thermal deformation of the resin base material, the coating solution for forming the protective layer is preferably heated at 40° C. to 120° C.

In addition, in a case of heating, the heating time is not particularly limited, but is preferably 1 minute to 30 minutes.

The coating solution for forming the protective layer containing the core-shell particles, and the formation of the protective layer from this coating solution for forming the protective layer have been described above, but the protective layer may be formed using a coating solution for forming the protective layer containing, instead of the core-shell particles, the hollow particles.

Here, from the viewpoint of affinity with the siloxane resin composing the matrix, hollow silica particles having silica as a main component are preferably used as the hollow particles.

Examples of the hollow silica particles include hollow particles described in JP2013-237593A, WO2007/060884A, and the like.

In addition, the hollow silica particles may be surface-unmodified hollow silica particles or surface-modified hollow silica particles.

In addition, in order to stabilize dispersion in the coating solution for forming the protective layer, or to improve the affinity and bondability with the siloxane resin, the hollow particles may be subjected to a physical surface treatment such as plasma discharge treatment and corona discharge treatment, or a chemical surface treatment by a surfactant, a coupling agent, and the like.

From the viewpoint of light-transmitting property and scratch resistance, the void volume in the protective layer is preferably 10% to 80%, more preferably 15% to 75%, and particularly preferably 20% to 55%.

From the viewpoint of strength, light-transmitting property, and haze, the diameter (hereinafter, also referred to as a "void diameter") of voids in the protective layer is preferably 25 nm or more and more preferably 30 nm or more. From the viewpoint of scratch resistance, the upper limit of the void diameter is preferably 80 nm or less and more preferably 70 nm or less.

The method for measuring the void diameter, void volume, and coefficient of variation of the void diameter of the protective layer is as follows.

The decorative film provided with the protective layer is cut in a direction orthogonal to the film surface, and the cut surface is observed with a scanning electron microscope (SEM) to measure the void diameter and the void volume.

In the SEM image (magnification: 50,000 times) of the cut surface, the equivalent circle diameter is calculated for each of 200 voids arbitrarily selected, and the average value thereof is defined as the void diameter.

In addition, in the SEM image (magnification: 50,000 times) of the cut surface, an image processing software (ImageJ) is used to perform image processing (binarization) to separate a void portion and a matrix portion (that is, a portion other than the voids including the siloxane resin), and the proportion of the void portion is calculated to obtain the void volume.

In a case where the diameter of voids has no anisotropy, the void volume is obtained as the volume fraction of the voids in the siloxane resin.

From the viewpoint of visibility and antireflection property, the refractive index of the protective layer in the present disclosure is preferably 1.05 to 1.6, more preferably 1.2 to 1.5, and still more preferably 1.2 to 1.4.

In the present disclosure, the refractive index is a refractive index for light having a wavelength of 550 nm at 25° C.

In addition, in order to make contamination such as wax and gasoline inconspicuous in a case of being used for exteriors of automobiles and the like, it is preferable to set the refractive index in a range close to those refractive indexes, that is, in a range of 1.4 to 1.5, which causes stains to be inconspicuous.

In addition, in the present disclosure, the film thickness and refractive index of each layer are obtained by measuring, for a single film of the protective layer formed on alkali-free glass OA-10G (manufactured by Nippon Electric Glass Co., Ltd.), a transmission spectrum using a spectrophotometer, and performing a fitting analysis using the transmittance obtained in the above measurement and a transmittance calculated by an optical interferometry. In addition, the refractive index can also be measured using a Kalnew precision refractometer (KPR-3000, manufactured by Shimadzu Corporation).

[Resin Layer]

In order to secure leveling of the cholesteric liquid crystal layer, it is preferable that the decorative film according to the embodiment of the present disclosure further has a resin layer between the cholesteric liquid crystal layer and the colored layer.

In addition, from the viewpoint of protecting the cholesteric liquid crystal layer, it is preferable that the decorative film according to the embodiment of the present disclosure further has a resin layer between the cholesteric liquid crystal layer and the protective layer.

The resin layer is preferably a layer containing a resin of a type different from that of the protective layer.

From the viewpoint of visibility, the resin layer is preferably a transparent resin layer, and more preferably a layer formed of a transparent film.

The transparent film is not particularly limited as long as a transparent film having a required strength and scratch resistance.

In the present disclosure, the "transparent" in the transparent film means that the total light transmittance of the transparent film is 85% or more. The total light transmittance of the transparent film can be measured by the same method as the total light transmittance of the temporary support described above.

The transparent film is preferably a film formed of a transparent resin, and specific examples thereof include a resin film including a resin such as a polyethylene terephthalate (PET) resin, a polyethylene naphthalate (PEN) resin, an acrylic resin, a polycarbonate (PC) resin, triacetyl cellulose (TAC), and cycloolefin polymer (COP).

In particular, from the viewpoint of shape-following property to the mold, a resin film, including an acrylic resin, a polycarbonate resin, or a polyethylene terephthalate resin in an amount of 60% by mass or more (more preferably 80% by mass or more and still more preferably 100% by mass) with respect to total resin components included in the transparent film, is preferable. In particular, a resin film, including an acrylic resin in an amount of 60% by mass or more (more preferably 80% by mass or more and still more preferably 100% by mass) with respect to total resin components included in the transparent film, is more preferable.

In addition, the thickness of the resin layer is not particularly limited, but is preferably 20 μm to 350 μm, more preferably 50 μm to 300 μm, and still more preferably 75 μm to 250 μm.

Furthermore, in a case where the resin layer is provided between the cholesteric liquid crystal layer and the protective layer, the relationship between the refractive index n1 of the protective layer and the refractive index n2 of the resin layer is preferably n1<n2. In addition, the refractive index of the resin layer is preferably in a range of 1.5 to 1.6.

As the transparent film, a commercially available product may be used, and examples of the commercially available product include ACRYPLEN (registered trademark) HBS010 (acrylic resin film, manufactured by Mitsubishi Chemical Corporation), and TECHNOLLOY (registered trademark) S001G (acrylic resin film, manufactured by Sumitomo Chemical Co., Ltd.), C000 (polycarbonate resin film, manufactured by Sumitomo Chemical Co., Ltd.), and C001 (acrylic resin/polycarbonate resin laminated film, manufactured by Sumitomo Chemical Co., Ltd.).

—Formation of Resin Layer—

The method for forming the resin layer is not particularly limited, and examples thereof include a method of laminating a transparent film on the above-described colored layer.

As a device used in a case of laminating the transparent film, a known laminator such as a laminator, a vacuum laminator, and an auto-cut laminator capable of improving productivity can be used.

It is preferable that the laminator is equipped with any heatable roller such as a rubber roller and can perform pressing and heating.

By heating from the laminator, at least one of the transparent film and the cholesteric liquid crystal layer is partially melted, and it is possible to further enhance adhesiveness between the cholesteric liquid crystal layer and the transparent film.

The temperature at which the transparent film is laminated may be determined according to the material of the transparent film, the melting temperature of the cholesteric liquid crystal layer, and the like, but is a temperature that the temperature of the transparent film can be preferably 60° C. to 150° C., more preferably 65° C. to 130° C., and particularly preferably 70° C. to 100° C.

In addition, in a case of laminating the transparent film, a linear pressure between the transparent film and the cholesteric liquid crystal layer is preferably 60 N/cm to 200 N/cm, more preferably 70 N/cm to 160 N/cm, and particularly preferably 80 N/cm to 120 N/cm.

[Layer Containing Ultraviolet Absorber]

It is preferable that the decorative film according to the embodiment of the present disclosure further has a layer containing an ultraviolet absorber between the cholesteric liquid crystal layer and the protective layer.

In addition, as the layer containing an ultraviolet absorber, the decorative film according to the embodiment of the present disclosure preferably has a resin layer containing an ultraviolet absorber, more preferably has a resin base material layer containing an ultraviolet absorber or a laminated base material layer in which a layer containing an ultraviolet absorber is laminated on a resin base material, and particularly preferably has a resin base material layer containing an ultraviolet absorber.

As the ultraviolet absorber, a known ultraviolet absorber can be used without particular limitation, and the ultraviolet absorber may be an organic compound or an inorganic compound.

Examples of the ultraviolet absorber include triazine compounds, benzotriazole compounds, benzophenone compounds, salicylic acid compounds, and metal oxide particles.

In addition, the ultraviolet absorber may be a polymer including an ultraviolet absorbing structure, and examples of the polymer including an ultraviolet absorbing structure include acrylic resins which include a monomer unit derived from an acrylic acid ester compound including at least a part of structures of a triazine compound, a benzotriazole compound, a benzophenone compound, a salicylic acid compound, and the like.

Examples of the metal oxide particles include titanium oxide, cerium oxide, zinc oxide, and zirconium oxide.

The average primary particle diameter of the inorganic particles having an ultraviolet absorbing ability is preferably 1 nm to 50 nm and more preferably 2 nm to 20 nm. In addition, the average secondary particle diameter of the inorganic particles having an ultraviolet absorbing ability is preferably 5 nm to 150 nm and more preferably 10 nm to 100 nm.

In addition, the above-described ultraviolet absorber preferably includes an ultraviolet absorber that any light transmittance, at wavelengths of 300 nm and 350 nm, of chloroform at 25° C. which has a concentration of 0.001% by mass per 1 cm of optical path length is less than 70%, and is more preferably an ultraviolet absorber that any light transmittance, at wavelengths of 300 nm and 350 nm, of chloroform at 25° C. which has a concentration of 0.001% by mass per 1 cm of optical path length is less than 70%. According to the above-described aspect, deterioration of the cholesteric liquid crystal layer after a long period of time is suppressed, and excellent designability with time retention is maintained.

The light transmittance of the ultraviolet absorber is a value measured by a spectrophotometer (V-670, manufactured by JASCO Corporation) at 25° C., in a state of storing a chloroform solution of the ultraviolet absorber, which is adjusted to have a concentration of 0.001% by mass, in a cell with an optical path length of 1 cm.

In addition, from the viewpoint of suppressing deterioration of heat insulation and discoloration of a heat-ray reflecting material, it is more preferable that the ultraviolet absorber is an ultraviolet absorber having a light transmittance, at wavelengths of 300 nm and 350 nm, of less than 60%, in a case of performing the above-described transmittance measurement.

It is still more preferable that the ultraviolet absorber has 90% or more of a light transmittance at a wavelength of 390 nm. In a case where the light transmittance at a wavelength of 390 nm is 90% or more, transparency of the ultraviolet absorber itself is high, and transparency of the decorative film can be increased.

From the viewpoint of excellent absorption characteristics to light of the above-described wavelengths, the ultraviolet absorber preferably includes at least one compound selected from the group consisting of a triazine-based compound and a benzotriazole-based compound.

The ultraviolet absorber may be used singly or in combination of two or more kinds thereof.

—Triazine-Based Compound—

The triazine-based compound can be selected from compounds having a triazine skeleton in a molecule.

Examples of the triazine-based compound include a hydroxyphenyltriazine compound. More specific examples thereof include a reaction product of 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-bis(2-hydroxy-4-butoxyphenyl)-6-(2,4-dibutoxyphenyl)-1,3,5-triazine, or 2-(2,4-dihydroxyphenyl)-4,6-bis(2,4-dimethylphenyl)-1,3,5-triazine, and (2-ethylhexyl)glycidate.

Among these, from the viewpoint of absorption characteristics of ultraviolet ray, the ultraviolet absorber is preferably a hydroxyphenyltriazine compound, and more preferably at least one compound selected from the group consisting of reaction products of 2,4-bis(2-hydroxy-4-butoxyphenyl)-6-(2,4-dibutoxyphenyl)-1,3,5-triazine or 2-(2,4-dihydroxyphenyl)-4,6-bis(2,4-dimethylphenyl)-1,3,5-triazine, and (2-ethylhexyl)glycidate.

—Benzotriazole-Based Compound—

The benzotriazole-based compound can be selected from compounds having a benzotriazole skeleton in a molecule.

Examples of the benzotriazole-based compound include a benzotriazole-based compound in which a nitrogen atom at a 2-position is replaced with an alkylphenyl group. More specific examples thereof include 2-ethylhexyl-3-[3-tert-butyl-4-hydroxy-5-(5-chloro-2H-benzotriazol-2-yl)phenyl] propionate, 3-(2H-benzotriazole-2-yl)-5-(1,1-dimethylethyl)-4-hydroxyphenyl propionic acid, 3-(2H-benzotriazol-2-yl)-5-(1,1-dimethylethyl)-4-hydroxyphenyl propionic acid alkyl ester (preferably methyl ester, 2-ethylhexyl ester, or octyl ester), 2-(2H-benzotriazol-2-yl)-6-(linear or side chain dodecyl)-4-methylphenol, 2-(2H-benzotriazol-2-yl)-6-(1-methyl-1-phenylethyl)-4-(1,1,3,3-tetramethylbutyl) phenol, 2-[5-chloro(2H)-benzotriazol-2-yl]-4-methyl-6-(tert-butyl)phenol, 2-(2H-benzotriazol-2-yl)-4,6-di-tert-pentylphenol, 2-(2'-hydroxy-5'-methylphenyl)benzotriazole, 2-(2-hydroxy-5-tert-butylphenyl)-2H-benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazol-2-yl)phenol), and 2-(2'-hydroxy-3'-tert-butyl-5'-methylphenyl)-5-chlorobenzotriazole.

Among these, the ultraviolet absorber is preferably a benzotriazole-based compound in which a nitrogen atom at a 2-position is replaced with an alkylphenyl group, and more preferably at least one compound selected from the group consisting of 2-(2-hydroxy-5-tert-butylphenyl)-2H-benzotriazole, 3-(2H-benzotriazol-2-yl)-5-(1,1-dimethylethyl)-4-hydroxyphenyl propionic acid, and 3-(2H-benzotriazol-2-yl)-5-(1,1-dimethylethyl)-4-hydroxyphenyl propionic acid alkyl ester.

As the ultraviolet absorber, a commercially available product may be used, and examples of the commercially available product include TINUVIN 400, TINUVIN 405, TINUVIN 460, TINUVIN 477, and TINUVIN 479 (all manufactured by BASF, triazine-based compound), and TINUVIN PS, TINUVIN 99-2, TINUVIN 384-2, TINUVIN 900, TINUVIN 928, TINUVIN 1130, and TINUVIN Carboprotect (all manufactured by BASF, benzotriazole-based compound).

Among these, TINUVIN PS, TINUVIN 99-2, TINUVIN 928, TINUVIN 405, TINUVIN 460, TINUVIN 477, or TINUVIN Carboprotect is preferable.

The content of the ultraviolet absorber in the layer containing an ultraviolet absorber is preferably 0.1 $g/m^2$ to 5 $g/m^2$, more preferably 0.2 $g/m^2$ to 4 $g/m^2$, and still more preferably 0.3 $g/m^2$ to 3 $g/m^2$. By setting the content of the ultraviolet absorber to be 0.1 $g/m^2$ or more, light resistance of the liquid crystal layer can be improved, and by setting the content of the ultraviolet absorber to be 5.0 $g/m^2$ or less, elution of the ultraviolet absorber from the layer containing an ultraviolet absorber can be suppressed.

[Pressure Sensitive Adhesive Layer]

From the viewpoint of adhesiveness to the base material to which the decorative film is attached, the decorative film according to the embodiment of the present disclosure may have a pressure sensitive adhesive layer between the temporary support and the colored layer.

In addition, as will be described later, before attaching to a base material, the temporary support may be peeled off, the pressure sensitive adhesive layer may be formed on the outermost layer on the colored layer side of the decorative film from which the temporary support has been peeled off, and then the pressure sensitive adhesive layer may be attached to the base material.

The material of the pressure sensitive adhesive layer is not particularly limited and can be suitably selected depending on the purpose.

Examples thereof include a layer containing a known pressure sensitive adhesive or adhesive.

—Pressure Sensitive Adhesive—

Examples of the pressure sensitive adhesive include an acrylic pressure sensitive adhesive, a rubber-based pressure sensitive adhesive, and a silicone-based pressure sensitive adhesive. In addition, examples of the pressure sensitive adhesive include acrylic pressure sensitive adhesives, ultraviolet (UV) curable pressure sensitive adhesives, and silicone-based pressure sensitive adhesives described in Chapters 2 of "Characterization evaluation of release paper, release film, and adhesive tape, and control technique thereof", 2004, Information Mechanism. The acrylic pressure sensitive adhesive refers to a pressure sensitive adhesive including a polymer ((meth)acrylicpolymer) of a (meth) acrylic monomer.

In a case of containing a pressure sensitive adhesive, the layer may further contain a viscosity imparting agent.

—Adhesive—

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. From the viewpoint of higher adhesive force, a urethane resin adhesive or a silicone adhesive is preferable.

—Method for Forming Pressure Sensitive Adhesive Layer—

The method for forming the pressure sensitive adhesive layer is not particularly limited, and examples thereof include a method of laminating a protective film on which the pressure sensitive adhesive layer is formed, such that the pressure sensitive adhesive layer and the colored layer are in contact with each other, a method of laminating the pressure sensitive adhesive layer alone so as to contact with the colored layer, and a method of coating the colored layer with a composition including the above-described pressure sensitive adhesive or adhesive. Examples of the laminating method or coating method include the same method as the above-described method of laminating the transparent film or the above-described coating method of the composition for forming the colored layer.

From the viewpoint of achieving both pressure sensitive adhesive force and handleability, the thickness of the pressure sensitive adhesive layer in the decorative film is preferably 5 μm to 100 μm.

[Other Layers]

The decorative film according to the embodiment of the present disclosure may have other layers in addition to the above-described layers.

Examples of the other layers include a reflective layer, a self-repairing layer, an antistatic layer, an antifouling layer, an anti-electromagnetic wave layer, and a conductive layer, which are known as a layer for a decorative film.

The other layers in the decorative film according to the embodiment of the present disclosure can be formed by known methods. Examples thereof include a method of applying a composition (composition for forming a layer) containing components included in these layers in a layered shape, and drying the composition.

—Cover Film—

For the purpose of preventing stains, and the like, the decorative film according to the embodiment of the present disclosure may have a cover film as an outermost layer of the protective layer side.

The cover film is not particularly limited as long as the cover film is formed of a material having flexibility and good peelability, and examples thereof include resin films such as a polyethylene film.

The method for attaching the cover film is not particularly limited, and examples thereof include a known attaching method, such as a method of laminating the cover film on the protective layer.

(Decorative Molded Film)

As a first embodiment, the decorative molded film according to an embodiment of the present disclosure is a decorative molded film including, in the following order, a base material, a colored layer, a cholesteric liquid crystal layer, and a protective layer, in which the decorative molded film is a film for viewing the colored layer through the cholesteric liquid crystal layer.

As a second embodiment, the decorative molded film according to an embodiment of the present disclosure is a decorative molded film including, in the following order, a colored layer, a cholesteric liquid crystal layer, a base material, and a protective layer, in which the decorative molded film is a film for viewing the colored layer through the cholesteric liquid crystal layer.

In a case of simply being referred to as the "decorative molded film according to the embodiment of the present disclosure", the case includes both the first embodiment and the second embodiment.

The colored layer, cholesteric liquid crystal layer, and protective layer in the decorative molded film according to the embodiment of the present disclosure are the same as the colored layer, cholesteric liquid crystal layer, and protective layer in the decorative film according to the embodiment of the present disclosure, and the preferred aspects are also the same. Furthermore, the preferred aspect of the other layers is also the same.

The base material in the decorative molded film according to the embodiment of the present disclosure is preferably a film base material. In addition, the base material in the decorative molded film according to the embodiment of the present disclosure is preferably a base material for molding. The base material is the same as a base material described later, and the preferred aspect is also the same.

In addition, as a method for manufacturing the decorative molded film according to the embodiment of the present disclosure, a method of attaching a base material, in a decoration method according to an embodiment of the present disclosure described later, can be referred to.

(Decoration Method and Decoration Product)

The decoration method according to an embodiment of the present disclosure is not particularly limited as long as a decoration method using the decorative film according to the embodiment of the present disclosure, but preferably includes a step of peeling off the temporary support from the decorative film according to the embodiment of the present disclosure, and a step of attaching the decorative film from which the temporary support has been peeled off to a base material from the colored layer side, and more preferably further includes a step of forming a pressure sensitive adhesive layer on a surface of the decorative film from which the temporary support has been peeled off, from which the temporary support has been peeled off.

The decoration product according to the present disclosure is a decoration product using the decorative film according to the embodiment of the present disclosure, and is preferably a decoration product obtained by the decoration method according to the embodiment of the present disclosure.

—Step of Peeling Off Temporary Support—

The decoration method according to the embodiment of the present disclosure preferably includes a step of peeling off the temporary support from the decorative film according to the embodiment of the present disclosure.

The peeling method is not particularly limited, and the temporary support may be peeled off by a known method. Examples thereof include a method of peeling off the temporary support while holding a part of the temporary support by a finger or an instrument such as tweezers.

—Step of Forming Pressure Sensitive Adhesive Layer—

The decoration method according to the embodiment of the present disclosure preferably includes a step (also simply referred to as a "step of forming a pressure sensitive adhesive layer") of forming a pressure sensitive adhesive layer on a surface of the decorative film from which the temporary support has been peeled off, from which the temporary support has been peeled off.

The pressure sensitive adhesive layer and method for forming a pressure sensitive adhesive layer are the same as the above-described pressure sensitive adhesive layer and method for forming a pressure sensitive adhesive layer, and the preferred aspects are also the same.

—Step of Attaching to Base Material—

The decoration method according to the embodiment of the present disclosure preferably includes a step (also simply referred to as a "step of attaching to a base material") of attaching the decorative film from which the temporary support has been peeled off to a base material from the colored layer side.

In the step of attaching to a base material, it is sufficient that, in the decorative film from which the temporary support has been peeled off, the outermost layer on the colored layer side is attached to the base material, and for example, the colored layer or pressure sensitive adhesive layer of the decorative film from which the temporary support has been peeled off may be attached to the base material.

The base material is not particularly limited, and a desired base material can be used. Specific examples thereof include automobiles, home appliances, audio products, computers, displays, in-vehicle products, watches, accessories, optical parts, doors, window glasses, building materials.

Among these, the decoration method according to the embodiment of the present disclosure can be suitably used as a decoration method for an automobile exterior.

In addition, as the base material, a base material for molding can be suitably used.

As the base material for molding, a known base material in the related art, as a base material used for molding such as three-dimensional molding and insert molding, can be used without particular limitation and may be appropriately selected depending on the application of the decorative film, suitability for insert molding, and the like.

In addition, the shape and material of the base material for molding is not particularly limited and may be appropriately selected as desired, but from the viewpoint of ease of insert molding, a film base material is preferable.

Specific examples of the base material for molding include a resin film including a resin such as a polyethylene terephthalate (PET) resin, a polyethylene naphthalate (PEN)

resin, an acrylic resin, a polycarbonate (PC) resin, triacetyl cellulose (TAC), cycloolefin polymer (COP), and acrylonitrile/butadiene/styrene copolymer resin (ABS resin).

From the viewpoint of having suitability for three-dimensional molding or insert molding, particularly having excellent following property to the mold, as the base material for molding, a resin film, including an acrylonitrile/butadiene/styrene copolymer resin (ABS resin) in an amount of 60% by mass or more with respect to total resin components included in the base material for molding, is preferable. The content of the ABS resin with respect to the total resin components included in the base material for molding is more preferably 80% by mass or more, and may be 100% by mass (that is, all the resin components are the ABS resin).

The base material for molding may contain other additives as necessary, in addition to the above-described resins.

Examples of such additives include lubricants such as mineral oil, hydrocarbons, fatty acids, alcohols, fatty acid esters, fatty acid amides, metallic soaps, natural waxes, and silicone; inorganic flame retardants such as magnesium hydroxide and aluminum hydroxide; organic flame retardants such as a halogen-based flame retardant and a phosphorus-based flame retardant; organic or inorganic fillers such as metal powder, talc, calcium carbonate, potassium titanate, glass fibers, carbon fibers, and wood powder; additives such as an antioxidant, an UV inhibitor, a lubricant, a dispersant, a coupling agent, a foaming agent, and a coloring agent; and engineering plastics other than the above-described resins, such as a polyolefin resin, a polyester resin, a polyacetal resin, a polyamide resin, and a polyphenylene ether resin.

As the base material for molding, a commercially available product may be used.

Examples of the commercially available product include ABS films (manufactured by Okamoto Industries, Inc.), ABS sheets (manufactured by SEKISUI SEIKEI CO., LTD.), Teflex (registered trademark) series (PET film, manufactured by TEIJIN FILM SOLUTIONS LIMITED), and Lumirror (registered trademark) easily moldable type (PET film, manufactured by TORAY INDUSTRIES, INC).

The thickness of the base material for molding is determined depending on the application of the produced decorative molded article, suitability for insert molding, handleability of the sheet, and the like, which is not particularly limited, but is preferably 100 µm to 800 µm and more preferably 150 µm to 600 µm.

—Attaching Method—

The method of attaching to the base material is not particularly limited, and a known method can be used.

Examples thereof include a method of, after peeling off the protective film of the pressure sensitive adhesive layer as necessary, laminating a base material on the pressure sensitive adhesive layer.

The laminating method is not particularly limited, and for example, the same method as the laminating method in the above-described transparent film can be used.

—Exposure Step—

The decoration method according to the embodiment of the present disclosure may include a step (also referred to as an "exposure step") of exposing the colored layer with light.

In a case of exposing the colored layer with light, the colored layer preferably contains the polymerizable compound and the photopolymerization initiator. By exposing the colored layer containing the polymerizable compound and the photopolymerization initiator, a cured colored layer can be obtained.

In addition, in a case where the colored layer contains the polymerizable compound and the photopolymerization initiator, the exposure may not be performed at the method for manufacturing the decorative film, and the decorative film may be exposed after attaching the decorative film after peeling off the protective film to the base material such that the base material and the pressure sensitive adhesive layer are in contact with each other. According to the above-described method, the adhesion force between the base material and the decorative film after peeling off the protective film.

—Exposure Timing—

In a case where the decoration method according to the embodiment of the present disclosure includes the exposure step, the timing of performing the exposure step is not particularly limited, and the exposure step may be performed before the step of peeling off the temporary support, before the step of forming the pressure sensitive adhesive layer, before the step of attaching to the base material, or after the step of attaching to the base material. However, from the viewpoint of improving adhesiveness between the cholesteric liquid crystal layer or resin layer and the cured colored layer, the exposure step is preferably performed before the step of peeling off the temporary support.

In addition, from the viewpoint of laminating property of the pressure sensitive adhesive layer, the exposure step is preferably performed before the step of forming the pressure sensitive adhesive layer.

Furthermore, from the viewpoint of ease of molding in a case where ductility during heating is required, the exposure step is preferably performed after the step of attaching to the base material.

—Exposure Method—

From the viewpoint of improving adhesiveness between the cholesteric liquid crystal layer or resin layer and the cured colored layer, the exposure in the exposure step is preferably performed from the protective layer side.

In addition, in a case of exposing in a state of having the temporary support (before peeling off the temporary support), the exposure may be performed from the temporary support side, or may be performed from both surfaces of the protective layer side and the temporary support side. In a case of performing the exposure from the temporary support side, as described above, the total light transmittance of the temporary support is preferably 80% or more and more preferably 90% or more.

In a case of performing the exposure after the step of peeling off the temporary support, the exposure may be performed from a side at which the temporary support has been peeled off, or may be performed from both surfaces of the protective layer side and the side at which the temporary support has been peeled off. In this case, the pressure sensitive adhesive layer may be formed on the side at which the temporary support has been peeled off, or the protective film may be further provided on the side at which the temporary support has been peeled off.

In a case of performing the exposure through the protective film, as described above, the total light transmittance of the protective film is preferably 80% or more and more preferably 90% or more.

As the exposure method, for example, methods described in paragraphs 0035 to 0051 of JP2006-023696A can be suitably used in the present disclosure.

As a light source for the exposure, any light source capable of irradiating light in a wavelength range in which the polymerizable compound can be cured (for example, 365 nm or 405 nm) can be appropriately selected and used.

Specific examples thereof include an ultra-high pressure mercury lamp, a high pressure mercury lamp, and a metal halide lamp.

The exposure amount is not particularly limited and may be set appropriately, but is preferably 5 mJ/cm$^2$ to 2,000 mJ/cm$^2$ and more preferably 10 mJ/cm$^2$ to 1,000 mJ/cm$^2$.

In the present step, it is not necessary for all the polymerizable compounds in the colored layer to react, and an unpolymerized polymerizable compound and a polymer of the polymerizable compound may coexist in the colored layer after exposure.

By further exposing the decorative molded article obtained after molding, in a state in which the specific polymerizable compound and a polymer of the specific polymerizable compound coexist in the colored layer after exposure, interlaminar adhesion (adhesiveness between the colored layer and the protective layer, and between the colored layer and the base material) can be further improved.

Here, an example of layer configuration of the decorative film will be described with reference to FIG. 1.

FIG. 1 is a schematic cross-sectional view showing an example of layer configuration of the decorative film according to the embodiment of the present disclosure.

A decorative film 20 has a colored layer 24 on a temporary support 22, and has a resin layer 26 on the colored layer 24. In addition, the resin layer 26 has a cholesteric liquid crystal layer 28 and a protective layer 30 on a surface opposite to the colored layer 24. The resin layer 26 is an arbitrary layer, and may not be included in the decorative film 20.

In addition, although not shown, the above-described peeling layer may be provided between the temporary support 22 and the colored layer 24.

Figure 2:
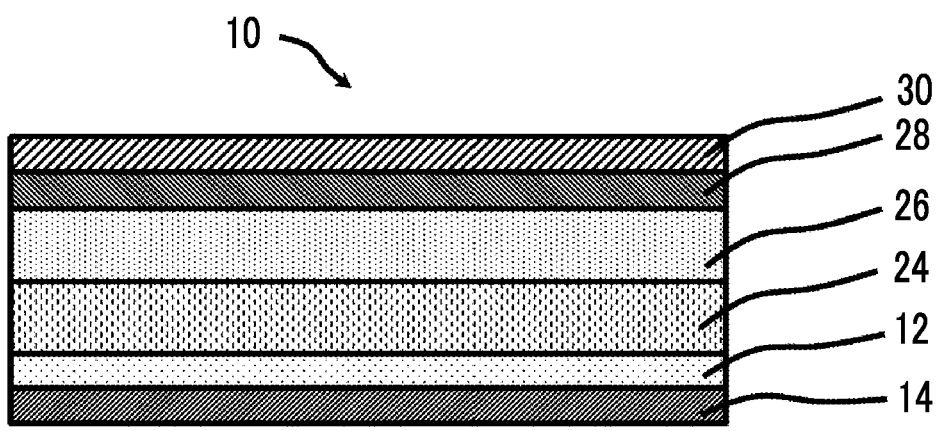
FIG. 2 is a schematic cross-sectional view showing another example of a decorative film according to the embodiment of the present disclosure.

FIG. 2 is a schematic cross-sectional view showing another example of the decorative film according to the embodiment of the present disclosure.

A decorative film 10 has a colored layer 24 on a pressure sensitive adhesive layer 12, and has, on the colored layer 24, a resin layer 26, a cholesteric liquid crystal layer 28, and a protective layer 30 in this order.

In addition, a protective film 14 is provided on a side of the pressure sensitive adhesive layer 12, opposite to the colored layer 24.

The pressure sensitive adhesive layer 12, protective film 14, and resin layer 26 are arbitrary layers, and may not be included in the decorative film 10.

Figure 3:
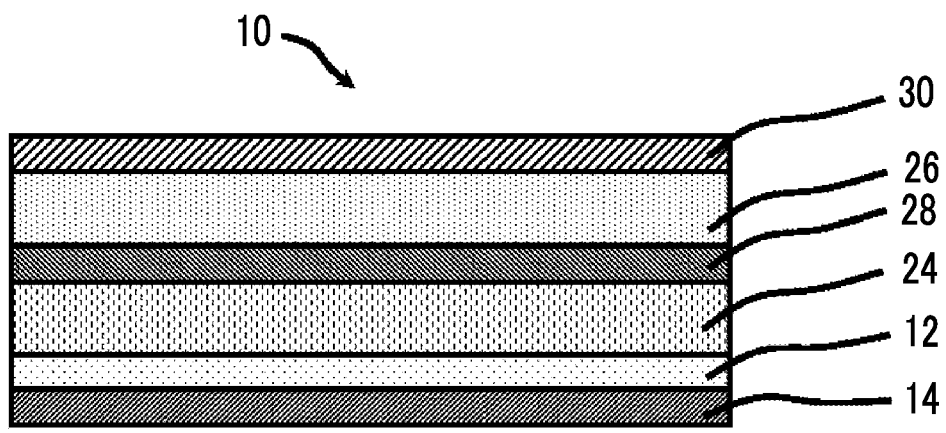
FIG. 3 is a schematic cross-sectional view showing still another example of a decorative film according to the embodiment of the present disclosure.

FIG. 3 is a schematic cross-sectional view showing another example of the decorative film according to the embodiment of the present disclosure.

A decorative film 10 has a colored layer 24 on a pressure sensitive adhesive layer 12, and has, on the colored layer 24, a cholesteric liquid crystal layer 28, a resin layer 26, and a protective layer 30 in this order.

In addition, a temporary support 14 is provided on a side of the pressure sensitive adhesive layer 12, opposite to the colored layer 24.

The pressure sensitive adhesive layer 12 and resin layer 26 are arbitrary layers, and may not be included in the decorative film 10.

Figure 4:
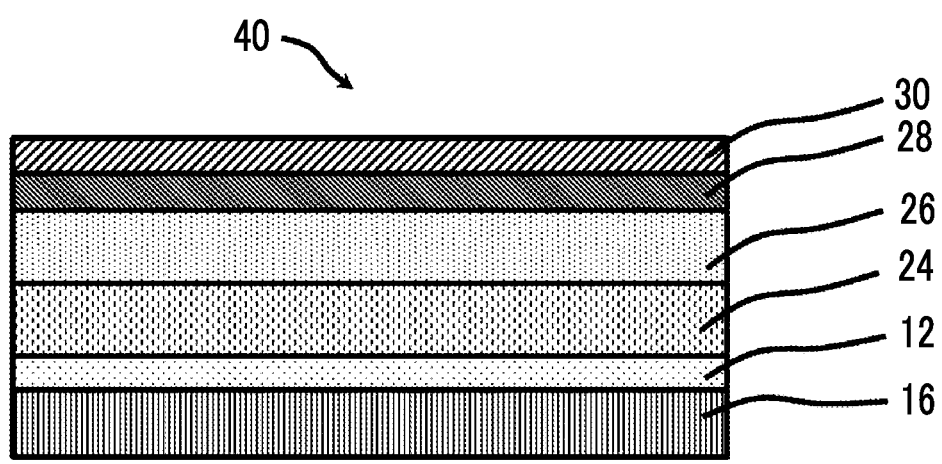
FIG. 4 is a schematic cross-sectional view showing one example of a decorative molded film according to the embodiment of the present disclosure.

FIG. 4 is a schematic cross-sectional view showing one example of the decorative molded film according to the embodiment of the present disclosure.

A decorative molded film 40 has, on a base material for molding 16, a pressure sensitive adhesive layer 12, a colored layer 24, a resin layer 26, a cholesteric liquid crystal layer 28, and a protective layer 30 in this order.

The pressure sensitive adhesive layer 12 and resin layer 26 are arbitrary layers, and may not be included in the decorative molded film 40.

Figure 5:
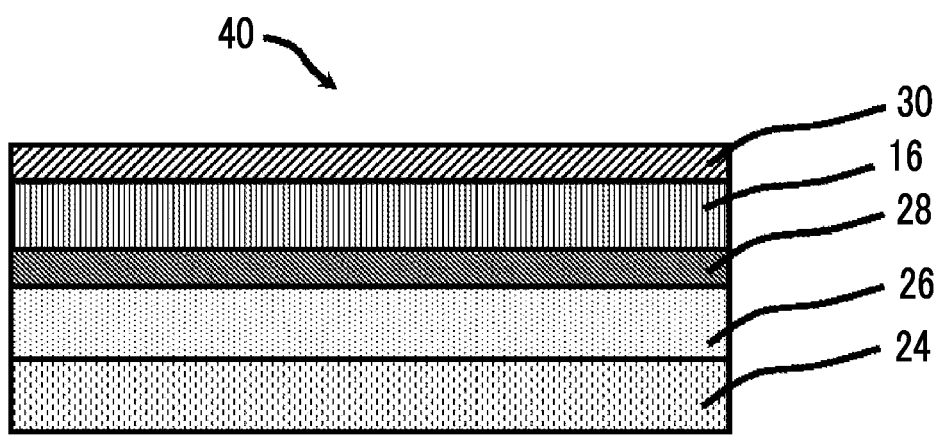
FIG. 5 is a schematic cross-sectional view showing another example of a decorative molded film according to the embodiment of the present disclosure.

FIG. 5 is a schematic cross-sectional view showing another example of the decorative molded film according to the embodiment of the present disclosure.

A decorative molded film 40 has a colored layer 24, a resin layer 26, a cholesteric liquid crystal layer 28, a base material for molding 16, and a protective layer 30 in this order.

The resin layer 26 is an arbitrary layer, and may not be included in the decorative molded film 40.

(Method for Manufacturing Decorative Molded Article, and Decorative Molded Article)

The method for manufacturing a decorative molded article according to an embodiment of the present disclosure is not particularly limited as long as a method for manufacturing a decorative molded article by performing decoration and molding using the decorative film according to the embodiment of the present disclosure, but preferably includes a step of peeling off the temporary support from the decorative film according to the embodiment of the present disclosure, and a step of attaching the decorative film from which the temporary support has been peeled off to a base material for molding from the colored layer side, and a step of molding the base material for molding to which the decorative film has been attached.

The decorative molded article according to the present disclosure is a decorative molded article obtained by using the decorative film according to the embodiment of the present disclosure or the decorative molded film according to the embodiment of the present disclosure, and is preferably manufactured by the method for manufacturing a decorative molded article according to the embodiment of the present disclosure.

Since the decorative film according to the embodiment of the present disclosure has excellent three-dimensional moldability, the decorative film according to the embodiment of the present disclosure can be suitably used for manufacturing a decorative molded article, and for example, it is particularly suitable for manufacturing a decorative molded article by at least one molding selected from the group consisting of three-dimensional molding and insert molding.

In addition, a decorative molded article may be manufactured by attaching the decorative film according to the embodiment of the present disclosure to a molded article after molding.

Since the decorative molded film according to the embodiment of the present disclosure has excellent three-dimensional moldability, the decorative molded film according to the embodiment of the present disclosure can be suitably used for manufacturing a decorative molded article. For example, in a case where the molded article is formed of a resin, the decorative molded film according to the embodiment of the present disclosure is particularly suitable for manufacturing a decorative molded article by at least one molding selected from the group consisting of three-dimensional molding and insert molding. In addition, in a case where the molded article is formed of a material which does not melt, such as metal, the decorative molded film according to the embodiment of the present disclosure is particularly suitable for manufacturing a decorative molded article by three-dimensional molding.

In a case of using the decorative film according to the embodiment of the present disclosure in a case of producing a decorative molded article, it can be applied to molds having more complicated shape, smaller shape, and the like, which expands the range of applications of the decorative molded article.

Hereinafter, the method for producing a decorative molded article will be described in detail by taking insert molding as an example.

In the insert molding, the decorative molded article is obtained, for example, by previously disposing a decorative molded film in a mold and injection-molding a base material resin into the mold. By this insert molding, a decorative molded article in which the surface of the resin molded article is integrated with the decorative film is obtained.

In addition, in a case of producing a decorative molded article, an adhesive layer may be provided between the decorative molded film and the resin molded article.

As an adhesive forming the adhesive layer, a known adhesive can be appropriately selected. Specific examples thereof include an adhesive including a vinyl chloride/vinyl acetate copolymer and an acrylic resin.

A commercially available product may be used as the adhesive, and examples of the commercially available product include IMB-003 manufactured by Teikoku Printing Inks Mfg. Co., Ltd.

Hereinafter, one embodiment of the method for producing a decorative molded article by insert molding will be described.

The method for producing a decorative molded article includes a step of disposing, in a mold for injection molding, a decorative molded film formed in a quadrilateral of a certain dimension and closing the mold, a step of injecting a molten resin into the molten, and a step of taking out a decorative molded article in a case where the injected resin has solidified.

The mold for injection molding (that is, molding mold) used for manufacturing the decorative molded article includes a mold (that is, male mold) having a convex shape, and a mold (that is, female mold) having a concave shape corresponding with the convex shape, and after disposing the decorative molded film on a molding surface which is an inner peripheral surface of the female mold, the mold is closed.

Here, before disposing the decorative molded film in the molding mold, by molding (preforming) the decorative molded film using the molding mold, it is also possible to apply a three-dimensional shape to the decorative molded film in advance and supply the decorative molded film to the molding mold.

In addition, in a case of disposing the decorative film in the molding mold, it is necessary to align the decorative molded film with the molding mold in a state of inserting the decorative molded film into the molding mold.

As a method of aligning the decorative molded film with the molding mold in a state of inserting the decorative molded film into the molding mold, there is a method of inserting and holding a fixing pin of the male mold into an alignment hole of the female mold.

Here, in the female mold, the alignment hole is formed in advance at an end portion (position where the three-dimensional shape is not formed after molding) of the decorative molded film.

In addition, in the male mold, the fixing pin is formed in advance at a position to be fitted with the alignment hole.

In addition, as a method of aligning the decorative molded film with the molding mold in a state of inserting the decorative molded film into the molding mold, the following method can be used in addition to the method of inserting the fixing pin into the alignment hole.

Examples thereof include a method of fine-adjusting and aligning the decorative molded film by driving on a transporting device side as a target to an alignment mark which is applied in advance to a position of the decorative molded film where the three-dimensional shape is not formed after molding. In this method, the alignment mark is preferably recognized at two or more diagonal points in a case of viewing from a product portion of the injection-molded product (decorative molded article).

After aligning the decorative molded film with the molding mold and closing the molding mold, a molten resin is injected into the molding mold in which the decorative molded film has been inserted. In a case of injection, the molten resin is injected on a side of the base material for molding of the decorative molded film.

The temperature of the molten resin injected into the molding mold is set depending on the physical properties of the used resin, and the like. For example, in a case where the used resin is an acrylic resin, the temperature of the molten resin is preferably in a range of 240° C. to 260° C.

For the purpose of suppressing abnormal deformation of the decorative molded film due to heat or gas generated in a case of injecting the molten resin into the molding mold, a position of an inlet (injection port) of the male mold may be set according to the shape of the molding mold and the type of the molten resin.

After solidifying the molten resin which is injected into the molding mold into which the decorative molded film has been inserted, the molding mold is opened, and an intermediate decorative molded article, in which the decorative molded film is fixed to a molding base material which is a solidified molten resin, is taken out from the molding mold.

In the intermediate decorative molded article, around a decorative part which will be the final product (decorative molded article), a burr and a dummy portion of the decorative molded article are integrated. Here, the dummy portion has an insertion hole formed by inserting the fixing pin in the above-described alignment.

Therefore, finishing is performed to remove the burr and the dummy portion from the decorative part of the intermediate decorative molded article before the finishing, thereby obtaining a decorative molded article.

By exposing the decorative molded article obtained as described above, the degree of curing of the colored layer in the decorative film may be increased.

By performing the exposure, adhesiveness between the colored layer and the transparent film, and between the colored layer and the decorative molded article is further enhanced, and durability against heat and the like is further improved.

The decorative film and decorative molded film according to the embodiment of the present disclosure are also suitable for three-dimensional molding.

Suitable examples of the three-dimensional molding include heat molding, vacuum molding, pressure molding, and vacuum pressure molding.

The method of performing the vacuum molding is not particularly limited, but is preferably a method of performing three-dimensional molding in a heated state under vacuum.

The vacuum means a state in which an inside of a chamber is evacuated to a vacuum degree of 100 Pa or less.

It is sufficient that the temperature in a case of performing the three-dimensional molding is appropriately set depending on the used base material for molding, but the temperature is preferably in a temperature range of 60° C. or higher, more preferably in a temperature range of 80° C. or higher, and still more preferably in a temperature range of 100° C. or higher. The upper limit of the temperature in a case of performing the three-dimensional molding is preferably 200° C.

The temperature in a case of performing the three-dimensional molding means a temperature of the base material for molding supplied for the three-dimensional molding, and is measured by attaching a thermocouple to the surface of the base material for molding.

The above-described vacuum molding can be performed using a vacuum molding technique widely known in the molding field, and for example, the vacuum molding may be performed using Formech 508FS manufactured by NIHON SEIZUKI KOGYO CO., LTD.

The application of the decorative molded article obtained as described above is not particularly limited and can be used for various products, and particularly suitable examples thereof include interior and exterior of automobiles, interior and exterior of electric appliances, and packaging containers.

EXAMPLES

Hereinafter, the present disclosure will be more specifically described with reference to Examples. The scope of the present disclosure is not limited to the specific examples shown below. In addition, "parts" is on a mass basis unless otherwise specified.

Examples 1 to 13, 15, and 16, and Comparative Examples 1 and 2

<Preparation of Composition for Forming Decorative Film>

[Preparation of Composition for Forming Colored Layer]

Compositions for forming a colored layer 1 to 3 having composition shown in Table 1 were prepared.

The numerical values in Table 1 mean parts by mass of each component with respect to the total mass of the composition for forming a colored layer, and "-" means that the component is not contained.

TABLE 1

| (Part by mass) | | | |
|---|---|---|---|
| | Composition for forming colored layer | | |
| | 1 | 2 | 3 |
| Black pigment dispersion liquid | 302.9 | 302.9 | 302.9 |
| Binder resin 1 | 253.9 | 253.9 | 253.9 |
| Polymerizable compound 1 | 74.4 | — | — |
| Polymerizable compound 2 | — | 74.4 | — |
| Polymerizable compound 3 | — | — | 74.4 |
| Polymerization initiator 1 | 0.9 | 0.9 | 0.9 |
| Surfactant 1 | 0.4 | 0.4 | 0.4 |
| Organic solvent 1 | 367.5 | 367.5 | 367.5 |
| Total | 1000 | 1000 | 1000 |

[Preparation of Composition for Forming Protective Layer]

Each of a composition for forming a protective layer 11 to 15 (coating solution 11 to 15) having composition shown in Tables 2 and 3 was prepared.

The numerical values in Tables 2 and 3 mean parts by mass of each component with respect to the total mass of the composition for forming a protective layer, and "-" means that the component is not contained.

TABLE 2

| (Part by mass) | | | |
|---|---|---|---|
| | Composition for forming protective layer | | |
| | Coating solution 11 | Coating solution 12 | Coating solution 13 |
| Binder resin 2 | 484.2 | 164.6 | — |
| Polymerizable compound 4 | 14.5 | 4.9 | 13.2 |
| Hollow silica dispersion liquid 1 | — | 144.0 | 144.0 |
| Polymerization initiator 2 | 1.0 | 1.0 | 1.0 |
| Surfactant 2 | 0.2 | 0.2 | 0.2 |
| Pure water | 99.2 | 99.2 | 276.9 |
| Organic solvent 2 | 400.8 | 586.0 | 564.7 |
| Total | 1000 | 1000 | 1000 |

TABLE 3

| (Part by mass) | | |
|---|---|---|
| | Composition for forming protective layer | |
| | Coating solution 14 | Coating solution 15 |
| Binder resin 3 | 370.7 | 185.1 |
| Isocyanate compound | 231.2 | 115.4 |
| Hollow silica dispersion liquid 2 | — | 675.0 |
| Surfactant 2 | 1.5 | 1.5 |
| Organic solvent 2 | 396.7 | 23.1 |
| Total | 1000 | 1000 |

Details of each component shown in Tables 1 to 3 are as follows.

[Preparation of Black Pigment Dispersion Liquid]

Carbon black, a dispersant, a polymer, and a solvent were mixed so as to be a black pigment dispersion liquid having a composition of the below, and a black pigment dispersion liquid was obtained by using a three-roll and a beads mill. The average particle diameter (median diameter) measured using Microtrac FRA (manufactured by Honeywell Japan Ltd.) was 163 nm.

—Composition of Black Pigment Dispersion Liquid—

Resin-coated carbon black produced according to the description of paragraphs 0036 to 0042 of JP5320652B: 20.0% by mass Dispersant 1 (the following structure): 1.0% by mass Polymer (benzyl methacrylate/methacrylic acid random copolymer product having a molar ratio of 72/28; weight-average molecular weight: 30,000): 6.0% by mass Propylene glycol monomethyl ether acetate: 73.0% by mass

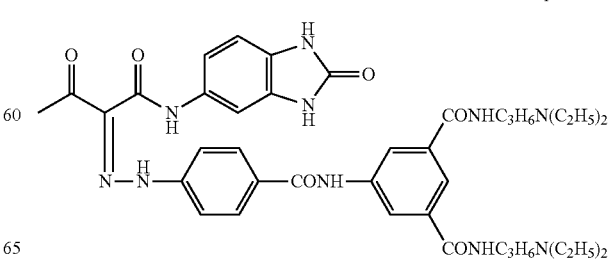

Dispersant 1

[Other Components]

Binder resin 1: 1-methoxy-2-propyl acetate solution containing 40% by mass of benzyl methacrylate/methacrylic acid (molar ratio: 70/30) copolymer (weight-average molecular weight Mw: 29,000)

Binder resin 2: solution in which a methacrylic acid/allyl methacrylate (molar ratio: 40/60) copolymer (weight-average molecular weight Mw: 25,000) is dissolved in aqueous ammonia (2.5% by mass) and the mixture is diluted with distilled water so that a concentration of solid contents is 5.0% by mass Binder resin 3: ethyl acetate/ethyl methyl ketone/isopropyl alcohol solution containing 35% by mass of a urethane-modified acrylic polymer (containing polyol)

Polymerizable compound 1: urethane acrylate oligomer, manufactured by Sartomer Japan Inc., CN-996NS (solid content: 100% by mass)

Polymerizable compound 2: ethylene oxide (EO) chain-containing monomer, manufactured by Sartomer Japan Inc., SR9035 (number of EO groups: 15, number of polymerizable groups: 3, solid content: 100% by mass)

Polymerizable compound 3: A-DPH (dipentaerythritol hexaacrylate, number of polymerizable groups: 6, solid content: 100% by mass) manufactured by Shin-Nakamura Chemical Co., Ltd.

Polymerizable compound 4: M-510 (polybasic acid-modified acrylic oligomer, number of polymerizable groups: 3, solid content: 100% by mass) manufactured by TOAGOSEI CO., LTD.

Isocyanate compound: MF-K60B (block type isocyanate compound, n-butyl acetate/n-butyl alcohol solution having a solid content of 60% by mass), manufactured by Asahi Kasei Corporation.

Hollow silica dispersion liquid 1: THRULYA 4110 (hollow silica dispersion liquid, isopropyl alcohol solution having a solid content of 20% by mass), manufactured by JGC C&C Hollow silica dispersion liquid 2: THRULYA 5320 (hollow silica dispersion liquid, methyl isobutyl ketone solution having a solid content of 20% by mass), manufactured by JGC C&C Polymerization initiator 1: OXE-02 (1-[9-ethyl-6-(2-methylbenzoyl)-9H-carbazol-3-yl]ethanone-1-(O-acetyloxime)), manufactured by BASF Polymerization initiator 2: Irgacure 2959 (1-[4-(2-hydroxyethoxy)phenyl]-2-hydroxy-2-methyl-1-propan-1-one), manufactured by BASF Surfactant 1: MEGAFACE (registered trademark) F-551, manufactured by DIC Corporation, methyl isobutyl ketone solution containing a perfluoroalkyl group-containing neutralized phosphoric acid ester type amine (solid content: 30% by mass)

Surfactant 2: MEGAFACE (registered trademark) F-444, manufactured by DIC Corporation, perfluoroalkylethylene oxide adduct (solid content: 100% by mass)

Organic solvent 1: methyl ethyl ketone

Organic solvent 2: methyl alcohol

[Preparation of Composition for Forming Cholesteric Liquid Crystal Layer]

Each of a composition for forming a cholesteric liquid crystal layer 21 to 23 (coating solution 21 to 23) having the following composition was prepared.

The numerical values shown below mean parts by mass of each component with respect to the total mass of the composition for forming a cholesteric liquid crystal layer.

—Composition of Coating Solution 21 (Blue, Composition Forming Cholesteric Liquid Crystal Layer Which Reflects Blue Light Having a Center Wavelength of 450 nm)—

Compound 1: 80 parts by mass
Compound 2: 20 parts by mass
Fluorine compound 1: 0.02 parts by mass
Fluorine compound 3: 0.01 parts by mass
Clockwise chiral agent LC756 (manufactured by BASF): 6.7 parts by mass
Polymerization initiator IRGACURE OXE01 (manufactured by BASF): 0.75 parts by mass
Solvent (methyl acetate): amount in which solid contents are 20% by mass —Composition of Coating Solution 22 (Green, Composition Forming Cholesteric Liquid Crystal Layer Which Reflects Green Light Having a Center Wavelength of 550 nm)—

Mixture 1: 100 parts by mass
Fluorine compound 1: 0.05 parts by mass
Fluorine compound 2: 0.04 parts by mass
Clockwise chiral agent LC756 (manufactured by BASF): 5.6 parts by mass
Polymerization initiator IRGACURE OXE01 (manufactured by BASF): 1.0 part by mass
Solvent (methyl ethyl ketone): amount in which solid contents are 25% by mass —Composition of Coating Solution 23 (Red, Composition Forming Cholesteric Liquid Crystal Layer Which Reflects Red Light Having a Center Wavelength of 650 nm)—

Mixture 1: 100 parts by mass
Fluorine compound 1: 0.05 parts by mass
Fluorine compound 2: 0.04 parts by mass
Clockwise chiral agent LC756 (manufactured by BASF): 4.7 parts by mass
Polymerization initiator IRGACURE OXE01 (manufactured by BASF): 1.0 part by mass
Solvent (methyl ethyl ketone): amount in which solid contents are 25% by mass The details of the compounds used in the coating solutions will be described below.

Mixture 1 (mixture of three compounds shown below)

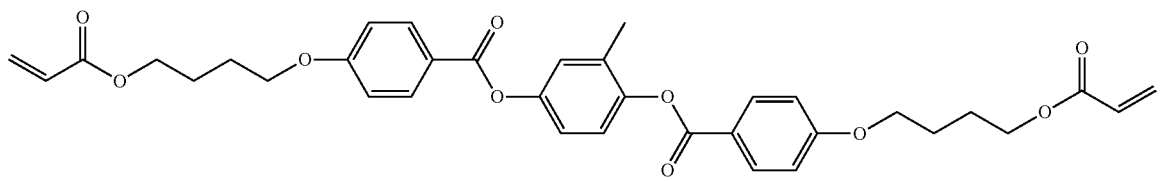

84%

-continued
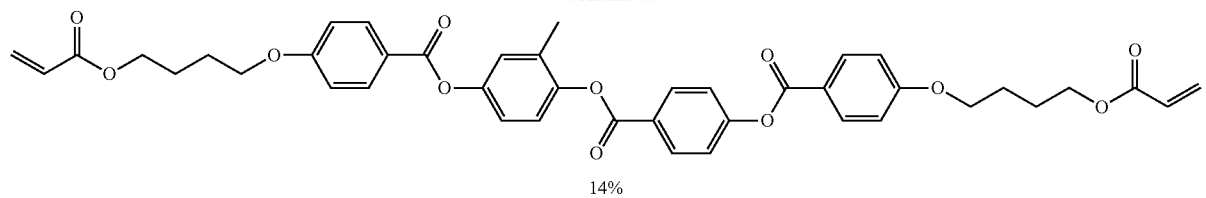
14%
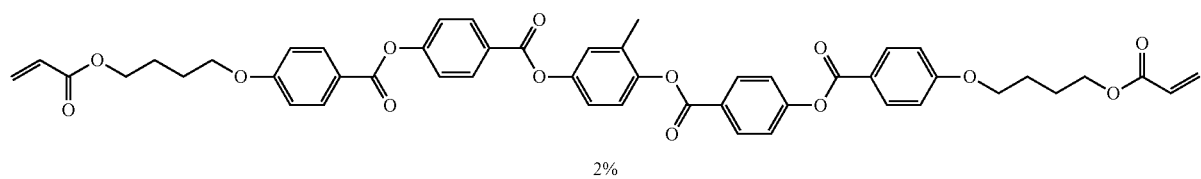
2%
Numerical value is % by mass
Compound 1 (compound shown below)
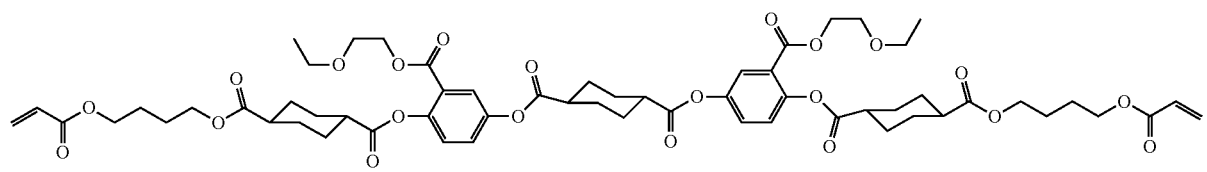
Compound 2 (compound shown below)
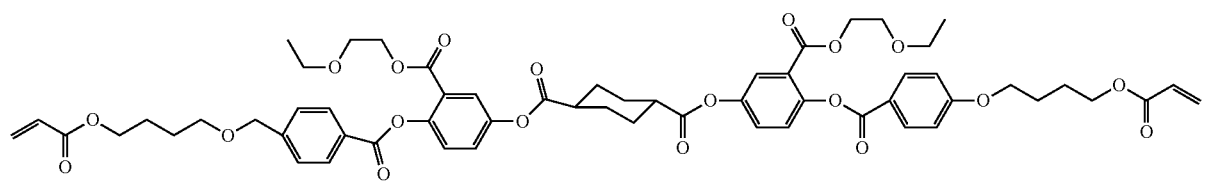
Fluorine compound 1 (compound shown below)
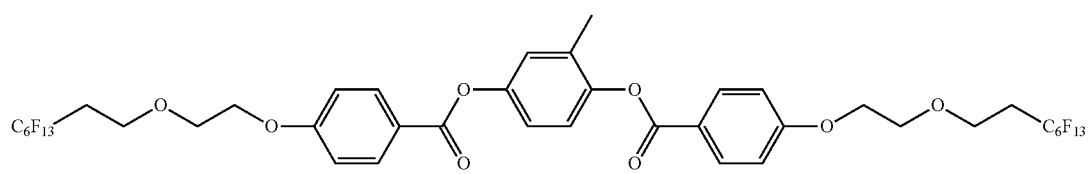
Fluorine compound 2 (compound shown below)
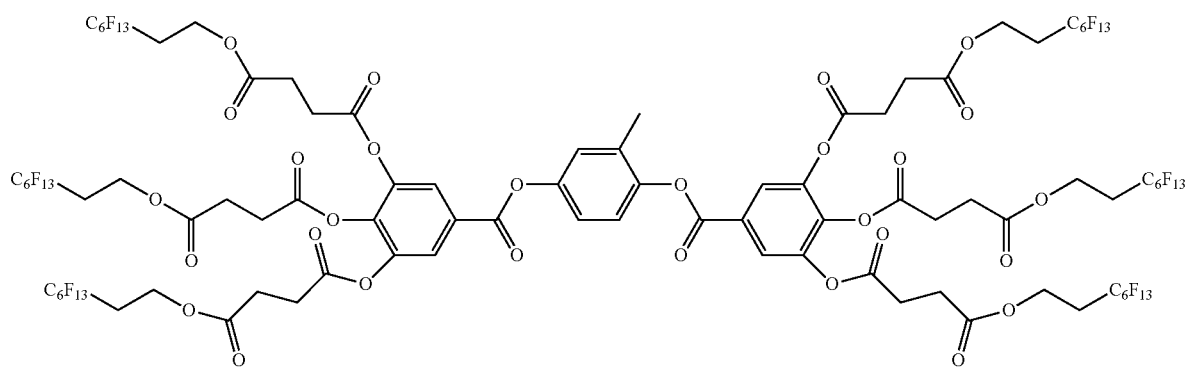

-continued

Fluorine compound 3 (compound shown below)

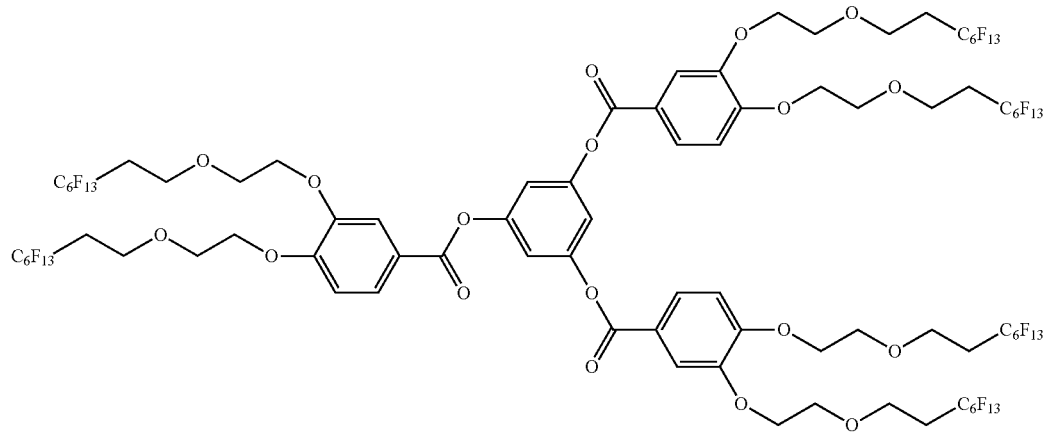

Each of the coating solutions 21, 22, and 23 was prepared by adjusting the prescription amount of the chiral agent LC756 in the composition of the coating solution. Using each coating solution, in a case where a single-layer cholesteric liquid crystal layer was produced on a peelable support in the same manner as in the following cholesteric liquid crystal layer production to check out reflection characteristics, all of the produced cholesteric liquid crystal layers were right-handed circularly polarized light reflecting layer.

By adjusting the addition amount of the chiral agent LC756 in the coating solutions 21, 22, and 23, the center wavelength of reflected light in the cholesteric liquid crystal layer produced using each coating solution was changed.

<Production of Decorative Film>

[Preparation of Temporary Support]

As a temporary support, a PET film with a peeling layer (Unipeel TR-6, thickness: 75 manufactured by UNITIKA LTD.) was prepared.

[Formation of Colored Layer (Step of Forming Colored Layer)]

Using an extrusion coater, a coating surface of the peeling layer of the temporary support was coated with any one of a composition for forming a colored layer 1 to a composition for forming a colored layer 3, which were compositions for forming a colored layer shown in Table 1, in an amount such that the thickness (thickness after drying) shown in Table 4 was obtained in order to form a composition layer for forming a colored layer as a coating layer, and the composition was dried at 110° C. for 2 minutes to form a colored layer. Thereafter, from the colored layer surface of the formed laminate, the entire surface was exposed in an exposure amount of 500 mJ/cm² (i-rays). Then, as a cover film A, a polyethylene film (thickness: 35 μm, GF-8 manufactured by Tamapoly Co., Ltd.) adhered to the colored layer.

[Preparation of Transparent Film]

As a transparent film, TECHNOLLOY S001G (acrylic resin film having a thickness of 100 μm, manufactured by Sumika Acryl Co., Ltd.) was prepared.

<Formation of Alignment Film>

Using a wire bar coater, TECHNOLLOY S001G was coated, at 24 mL/m², with a coating solution for forming an alignment film having the following composition, and the coating solution was dried by warm air at 80° C. for 120 seconds to obtain an alignment film having a thickness after drying of 30 nm.

[Composition of Coating Solution for Forming Alignment Film]

Modified polyvinyl alcohol shown below: 28 parts by mass
Citric acid ester (AS3, manufactured by SANKYO CHEMICAL Co., Ltd.): 1.2 parts by mass
Photoinitiator (IRGACURE 2959, manufactured by BASF): 0.84 parts by mass
Glutaraldehyde: 2.8 parts by mass
Water: 699 parts by mass
Methanol: 226 parts by mass Modified polyvinyl alcohol (the following compounds; the numbers at the lower right of each constitutional unit represent the molar ratio)

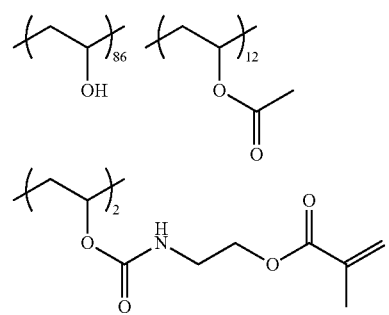

<Production of Cholesteric Liquid Crystal Layer>

The produced alignment film was subjected to a rubbing treatment (rayon cloth, pressure: 0.1 kgf (0.98 N), rotation speed: 1,000 rpm, transporting speed: 10 m/min, number of times: 1 round trip) in a direction rotated counterclockwise by 31.5° with respect to a short side direction.

After coating the rubbing-treated surface with the coating solutions 21 to 23 shown in Table 4 using a wire bar, the coating solution was dried and heat-treated at 85° C. for 1 minute. Thereafter, the alignment film was placed on a hot plate at 80° C., and irradiated with UV in an exposure amount of 15 mJ/cm² using an electrodeless lamp "D bulb" manufactured by Heraeus Holding to fix a cholesteric liquid crystal layer, thereby obtaining a cholesteric liquid crystal layer having a thickness of 0.43 μm. Then, as a cover film B, a polyethylene film (thickness: 35 μm, GF-8 manufactured by Tamapoly Co., Ltd.) adhered to the cholesteric liquid crystal layer.

[Laminate of Transparent Film (Step of Forming Laminate]

Furthermore, after peeling off the cover film A from the colored layer, the transparent film having a liquid crystal layer was laminated so that a smooth surface of the transparent film opposite to a surface in contact with the liquid crystal layer was in contact with the colored layer.

As laminating conditions, the roll temperature was 90° C., the linear pressure was 100 N/cm, and the transporting speed was 0.1 m/min.

As a result, a laminate composed of the temporary support, the uncured colored layer, and the transparent film was formed.

<Production of Transparent Film>

[Formation of Protective Layer on Surface of Transparent Film]

As shown in Table 4, after laminating the transparent film, a protective layer was formed on the cholesteric liquid crystal layer after peeling off the cover film B from the cholesteric liquid crystal layer.

Specifically, using an extrusion coater, a surface of the cholesteric liquid crystal layer opposite to a surface in contact with the alignment film was coated with any one of coating solutions 11 to 15, which were compositions for forming a protective layer shown in Table 2 or Table 3, in an amount such that the thickness (thickness after drying) shown in Table 4 was obtained in order to form a composition layer for forming a protective layer as a coating layer, and the composition was dried at 110° C. for 2 minutes to form a protective layer. Thereafter, as a cover film C, a polyethylene film (thickness: 35 μm, GF-8 manufactured by Tamapoly Co., Ltd.) adhered to a protective layer.

In Table 4, in the example described as "none" in the column of transparent film, the transparent film was not used and the protective layer was directly formed.

As a result, a laminate composed of the temporary support, the colored layer, the transparent film (only some of the examples), the alignment film, the cholesteric liquid crystal layer, the protective layer, and the cover film C was formed.

—Exposure (Exposing Step)—

Thereafter, from both surfaces of the formed laminate, the entire surface was exposed in an exposure amount of 500 mJ/cm$^2$ (i-rays).

—Pressure Sensitive Adhesive Layer Adhesion—

After peeling off the temporary support from the laminate after exposure, a pressure sensitive adhesive sheet (G25, manufactured by Nichiei Kako Co., Ltd.) was laminated on a surface of the laminate, from which the temporary support was peeled off, after peeling off a protective film on one side of the pressure sensitive adhesive sheet having protective films on both surfaces (temperature: 30° C., linear pressure: 100 N/cm, transporting speed: 0.1 m/min). The protective film on the other side of the pressure sensitive adhesive sheet was not peeled off.

As a result, decorative films of Examples 1 to 13, having, in the following order, the protective film, the pressure sensitive adhesive layer, the colored layer, the transparent film (only some of the examples), the alignment film, the cholesteric liquid crystal layer, the protective layer, and the cover film C, were produced.

Example 14

In Example 1, after peeling off the remaining protective film of the pressure sensitive adhesive sheet, an acrylonitrile-butadiene-styrene copolymer (ABS) film (also referred to as an ABS backer) was laminated (thickness: 250 μm, manufactured by Okamoto Industries, Inc.; laminating temperature: 30° C., linear pressure: 100 N/cm, transporting speed: 0.1 m/min), thereby producing a decorative molded film of Example 14 having, in this order, ABS, the pressure sensitive adhesive layer, the colored layer, the transparent film, the alignment film, the cholesteric liquid crystal layer, the protective layer, and the cover film C.

Regarding Examples 11 to 15, the refractive index of the protective layer of each Example was respectively 1.52 in Example 11, 1.27 in Example 12, 1.20 in Example 13, 1.52 in Example 14, and 1.36 in Example 15.

<Production of Resin Base Material Containing Ultraviolet Absorber>

99 parts of methyl methacrylate (manufactured by FUJIFILM Wako Pure Chemical Corporation), 1 part of methacrylic acid (manufactured by FUJIFILM Wako Pure Chemical Corporation), and 0.1 parts of V-601 (azo-based polymerization initiator, manufactured by FUJIFILM Wako Pure Chemical Corporation) were mixed and reacted at 60° C. in methyl ethyl ketone (MEK) to obtain a copolymer A (Mw=100,000).

85 parts of the obtained copolymer A, 14 parts of rubber elastic particles (METABLEN W450A, manufactured by Mitsubishi Chemical Corporation), and an ultraviolet absorber shown in Table 6 in an amount so to be the content shown in Table 6 (for example, in Example 18, 1 part of ADK STAB LA-31G manufactured by ADEKA CORPORATION) were put in an extruder, and the mixture was melt-kneaded at 230° C. for an average residence time of 10 minutes to obtain resin pellets of an ultraviolet absorber-containing acrylic resin composition.

The obtained resin pellets of the acrylic resin composition were melt-kneaded in the extruder at 245° C., extrusion-molded into a film, and cooled to obtain an acrylic resin film 2 containing an ultraviolet absorber, which has a thickness of 150 μm.

Example 17

A laminate (decorative film) in which the temporary support, the pressure sensitive adhesive layer, the colored layer, the cholesteric liquid crystal layer, the transparent film, and the protective layer were laminated in this order (corresponding to the configuration of FIG. 3), was produced in the same manner as in Example 1, except that, after peeling off the cover film A from the colored layer, the transparent film having a liquid crystal layer was laminated so that the cholesteric surface was in contact with the colored layer, and the protective layer was applied to the surface of the transparent film opposite to the liquid crystal layer. Each performance evaluation was performed in the same manner as in Example 1. Furthermore, evaluation of long-term durability described later was also performed. The evaluation results are shown in Table 5.

Examples 18 to 31

Using an acrylic resin film containing an ultraviolet absorber prepared by the prescription of the ultraviolet absorber shown in Table 6, a laminate was produced according to the configuration of Example 17, and each performance evaluation was performed in the same manner as in Example 1. Furthermore, evaluation of long-term durability described later was also performed. The evaluation results are shown in Table 5.

The details of ultraviolet absorbers used in Examples 27 to 31 are as follows.
TINUVIN 928 (manufactured by BASF, benzotriazole type)
TINUVIN PS (manufactured by BASF, benzotriazole type)
TINUVIN 1600 (manufactured by BASF, triazine type)
TINUVIN 460 (manufactured by BASF, triazine type)
CHIMASSORB 81 (manufactured by BASF, benzophenone type)

Example 32

A laminate was produced in the same manner as in Example 17, except that a surface of the transparent film of Example 17 opposite to the liquid crystal layer was coated with a coating solution A for forming a layer containing an ultraviolet absorber described below such that the layer thickness is 10 μm, the coating solution A was dried at 120° C. for 2 minutes to form a layer containing an ultraviolet absorber, and then the layer containing an ultraviolet absorber was coated with a protective layer. Each performance evaluation was performed in the same manner as in Example 1. Furthermore, evaluation of long-term durability described later was also performed. The evaluation results are shown in Table 5.
<Coating Solution A for Forming Layer Containing Ultraviolet Absorber>
Polymer (benzyl methacrylate/methacrylic acid random copolymer having a molar ratio of 72/28; weight-average molecular weight: 30,000): 8.5% by mass
Methyl ethyl ketone: 90% by mass
ADK STAB LA-31G (benzotriazole-based ultraviolet absorber, manufactured by ADEKA CORPORATION): 1.5% by mass
<Evaluation>
Regarding the decorative films obtained in each Example and Comparative Example, the following evaluations were performed. The evaluation results are shown in Tables 4 and 5.
[Film Appearance Evaluation]
Regarding the appearance of the decorative film before molding of each Example and Comparative Example, the function evaluation was performed according to the following standard.
—Change in Design (Color Variability Depending on Viewing Direction)—
Regarding the obtained decorative film, in a case where a direction perpendicular to a surface direction of the decorative film was set to 0°, the change in tint in a case of viewing from the angles of 0° and 45° (for example, yellow in the 0° direction, blue in the 45° direction, and the like) was evaluated.
The evaluation result is preferably A or B and more preferably A.
<<Evaluation Standard>>
A: there was a strong change in tint between a case of viewing from the 0° direction and a case of viewing from the 45° direction.
B: there was a change in tint between a case of viewing from the 0° direction and a case of viewing from the 45° direction.
C: there was no change in tint between a case of viewing from the 0° direction and a case of viewing from the 45° direction.
—Black Tightness—
Regarding the obtained decorative film, in a case where a direction perpendicular to the film was set to 0°, the function evaluation of the blackness of the film was performed in a case of viewing from an angle of 45° and being reflected by a fluorescent lamp.
The evaluation is preferably A.
<<Evaluation Standard>>
A: reflection of the fluorescent lamp was fluorescence.
B: fluorescent lamp was strongly reflected, and the whole looked whitish.
[Durability]
Regarding the appearance of the decorative film before molding of each Example and Comparative Example, the function evaluation was performed according to the following standard.
—Wiping Resistance—
Assuming durability during use, the wiping resistance was evaluated by the following method.
The resin layer, as the upper surface, of the decorative film obtained in each Example and each Comparative Example was dry-wiped with KimWipes (manufactured by NIPPON PAPER CRECIA CO., LTD.), after fixing the back surface with an adhesive tape. The dry wiping was performed 100 times with a force of approximately 500 g/cm$^2$, and the appearance after wiping was evaluated.
The evaluation is preferably A or B and more preferably A.
<<Evaluation Standard>>
A: almost no scratches were seen even in a case where the film was checked in detail.
B: several scratches were seen even in a case where the film was checked in detail.
C: scratches were seen by visual inspection of the film.
[Evaluation of Three-Dimensional Moldability]
Assuming an emblem of an automobile, three-dimensional moldability was evaluated for cracks and the like during stretching with respect to a cylindrical stainless member having a diameter of 10 cm and a height of 3 mm. Prior to a test, the film obtained in Example 14 in which ABS was laminated was used for the test as it was, and regarding other Examples and Comparative Examples, after peeling off the protective sheet of the pressure sensitive adhesive sheet, an ABS film was laminated (thickness: 250 μm, manufactured by Okamoto Industries, Inc.; laminating temperature: 30° C., linear pressure: 100 N/cm, transporting speed: 0.1 m/min) and then the test was performed.
Using a cylindrical member, the obtained decorative film was vacuum-molded at a heating temperature of 120° C., and it was evaluated whether or not cracks occurred on the surface.
[Evaluation of Long-Term Durability]
Regarding the obtained decorative film, using a weathering tester of a metal halide light source (SUV-W161, manufactured by IWASAKI ELECTRIC CO., LTD.), irradiation was performed, from the protective layer side, for 850 hours at an illuminance of 100 mW/cm$^2$ (black panel temperature: 63° C., humidity: 50% RH), and the change in tint of the film was evaluated.
The decorative film can be used with any of the results, but in a case of particularly being used for outdoor use, the evaluation result is preferably A, B, or C, more preferably A or B, and particularly preferably A.
A: there was a strong change in tint between a case of viewing from the 0° direction (direction perpendicular to the surface direction) and a case of viewing from the 45° direction (direction inclined by 45° from the direction perpendicular to the surface direction).

B: there was a change in tint between a case of viewing from the 0° direction and a case of viewing from the 45° direction.

B: there was a slight change in tint between a case of viewing from the 0° direction and a case of viewing from the 45° direction.

D: there was no change in tint between a case of viewing from the 0° direction and a case of viewing from the 45° direction.

TABLE 4

| | Colored layer | | Cholesteric liquid crystal layer | | | Protective layer | | Film appearance | | Durability | | Three- |
|---|---|---|---|---|---|---|---|---|---|---|---|---|
| | Coating solution | Thickness [μm] | Coating solution | Thickness [μm] | Transparent film | Coating solution | Thickness [μm] | Change in design | Black tightness | Wiping resistance | | dimensional moldability |
| Example 1 | 1 | 8 | 21 | 0.4 | Acrylic | 13 | 5 | A/Black to blue | A | A | | A |
| Example 2 | 2 | 8 | 21 | 0.4 | Acrylic | 13 | 5 | A/Black to blue | A | A | | A |
| Example 3 | 3 | 8 | 21 | 0.4 | Acrylic | 13 | 5 | A/Black to blue | A | A | | B |
| Example 4 | 1 | 3 | 21 | 0.4 | Acrylic | 13 | 5 | A/Black to blue | A | A | | A |
| Example 5 | 1 | 1 | 21 | 0.4 | Acrylic | 13 | 5 | A/Black to blue | A | A | | B |
| Example 6 | 1 | 8 | 22 | 0.5 | Acrylic | 13 | 5 | A/Blue to yellow | A | A | | A |
| Example 7 | 1 | 8 | 23 | 0.6 | Acrylic | 13 | 5 | A/Yellow to red | A | A | | A |
| Example 8 | 1 | 8 | 21 | 0.4 | Acrylic | 12 | 5 | A/Black to blue | A | A | | A |
| Example 9 | 1 | 8 | 21 | 0.4 | Acrylic | 11 | 5 | A/Black to blue | B | A | | A |
| Example 10 | 1 | 8 | 21 | 0.4 | Acrylic | 13 | 3 | A/Black to blue | A | B | | B |
| Example 11 | 1 | 8 | 21 | 0.4 | Acrylic | 13 | 10 | A/Black to blue | A | A | | A |
| Example 12 | 1 | 8 | 21 | 0.2 | Acrylic | 13 | 5 | B/Black to blue | A | A | | A |
| Example 13 | 1 | 8 | 21 | 0.4 | None | 13 | 5 | A/Black to blue | A | A | | A |
| Example 14 | 1 | 8 | 21 | 0.4 | Acrylic | 13 | 5 | A/Black to blue | A | A | | A |
| Example 15 | 1 | 8 | 21 | 0.4 | Acrylic | 14 | 10 | A/Black to blue | B | A | | A |
| Example 16 | 1 | 8 | 21 | 0.4 | Acrylic | 15 | 10 | A/Black to blue | A | A | | A |
| Comparative Example 1 | 1 | 8 | 21 | 0.4 | Acrylic | None | | A/Black to blue | A | C | | B |
| Comparative Example 2 | 1 | 8 | None | | Acrylic | 13 | 5 | C | A | A | | A |

TABLE 5

| | Colored layer | | Cholesteric liquid crystal layer | | | Protective layer | | Layer including ultraviolet absorber |
|---|---|---|---|---|---|---|---|---|
| | Coating solution | Thickness [μm] | Coating solution | Thickness [μm] | Transparent film | Coating solution | Thickness [μm] | Coating solution |
| Example 17 | 1 | 8 | 21 | 1 | Acrylic | 13 | 5 | — |
| Example 18 | 1 | 8 | 21 | 1 | Acrylic | 13 | 5 | — |
| Example 19 | 1 | 8 | 21 | 1 | Acrylic | 13 | 5 | — |
| Example 20 | 1 | 8 | 21 | 1 | Acrylic | 13 | 5 | — |
| Example 21 | 1 | 8 | 21 | 1 | Acrylic | 13 | 5 | — |
| Example 22 | 1 | 8 | 21 | 1 | Acrylic | 13 | 5 | — |
| Example 23 | 1 | 8 | 21 | 1 | Acrylic | 13 | 5 | — |
| Example 24 | 1 | 8 | 21 | 1 | Acrylic | 13 | 5 | — |
| Example 25 | 1 | 8 | 21 | 1 | Acrylic | 13 | 5 | — |
| Example 26 | 1 | 8 | 21 | 1 | Acrylic | 13 | 5 | — |
| Example 27 | 1 | 8 | 21 | 1 | Acrylic | 13 | 5 | — |
| Example 28 | 1 | 8 | 21 | 1 | Acrylic | 13 | 5 | — |
| Example 29 | 1 | 8 | 21 | 1 | Acrylic | 13 | 5 | — |
| Example 30 | 1 | 8 | 21 | 1 | Acrylic | 13 | 5 | — |
| Example 31 | 1 | 8 | 21 | 1 | Acrylic | 13 | 5 | — |
| Example 32 | 1 | 8 | 21 | 1 | Acrylic | 13 | 5 | A |

| | Layer including ultraviolet absorber | Film appearance | | Durability | | Three- |
|---|---|---|---|---|---|---|
| | Thickness [μm] | Change in design | Black tightness | Wiping resistance | Long-term durability | dimensional moldability |
| Example 17 | — | A/Black to blue | A | A | D | A |
| Example 18 | — | A/Black to blue | A | A | A | A |

TABLE 5-continued

|  |  |  |  |  |  |  |
|---|---|---|---|---|---|---|
| Example 19 | — | A/Black to blue | A | A | A | A |
| Example 20 | — | A/Black to blue | A | A | A | A |
| Example 21 | — | A/Black to blue | A | A | C | A |
| Example 22 | — | A/Black to blue | A | A | B | A |
| Example 23 | — | A/Black to blue | A | A | A | A |
| Example 24 | — | A/Black to blue | A | A | A | A |
| Example 25 | — | A/Black to blue | B | A | A | A |
| Example 26 | — | A/Black to blue | C | A | A | A |
| Example 27 | — | A/Black to blue | C | A | B | A |
| Example 28 | — | A/Black to blue | A | A | A | A |
| Example 29 | — | A/Black to blue | A | A | A | A |
| Example 30 | — | A/Black to blue | A | A | A | A |
| Example 31 | — | A/Black to blue | A | A | C | A |
| Example 32 | 10 | A/Black to blue | A | A | B | A |

TABLE 6

Ultraviolet absorber in transparent film or layer including ultraviolet absorber

|  | Type of ultraviolet absorber | Method for containing ultraviolet absorber | Chemical structure species of ultraviolet absorber | Transmittance at wavelength of 300 nm | Transmittance at wavelength of 350 nm | Content ($g/m^2$) |
|---|---|---|---|---|---|---|
| Example 17 | None | — | — | — | — | — |
| Example 18 | ADK STAB LA-31G | Kneading in resin base material | Benzotriazole-based | 0.30 | 0.29 | 1.5 |
| Example 19 | ADK STAB LA-31G | Kneading in resin base material | Benzotriazole-based | 0.30 | 0.29 | 0.5 |
| Example 20 | ADK STAB LA-31G | Kneading in resin base material | Benzotriazole-based | 0.30 | 0.29 | 0.05 |
| Example 21 | ADK STAB LA-31G | Kneading in resin base material | Benzotriazole-based | 0.30 | 0.29 | 0.1 |
| Example 22 | ADK STAB LA-31G | Kneading in resin base material | Benzotriazole-based | 0.30 | 0.29 | 0.2 |
| Example 23 | ADK STAB LA-31G | Kneading in resin base material | Benzotriazole-based | 0.30 | 0.29 | 0.3 |
| Example 24 | ADK STAB LA-31G | Kneading in resin base material | Benzotriazole-based | 0.30 | 0.29 | 3 |
| Example 25 | ADK STAB LA-31G | Kneading in resin base material | Benzotriazole-based | 0.30 | 0.29 | 4 |
| Example 26 | ADK STAB LA-31G | Kneading in resin base material | Benzotriazole-based | 0.30 | 0.29 | 5 |
| Example 27 | TINUVIN 928 | Kneading in resin base material | Benzotriazole-based | 0.49 | 0.48 | 1.5 |
| Example 28 | TINUVIN PS | Kneading in resin base material | Benzotriazole-based | 0.33 | 0.39 | 1.5 |
| Example 29 | TINUVIN 1600 | Kneading in resin base material | Triazine-based | 0.28 | 0.11 | 1.5 |
| Example 30 | TINUVIN 460 | Kneading in resin base material | Triazine-based | 0.28 | 0.11 | 1.5 |
| Example 31 | CIMASS0RB81 | Kneading in resin base material | Benzophenone-based | 0.62 | 0.81 | 1.5 |
| Example 32 | ADK STAB LA-31G | Forming layer including ultraviolet absorber on resin base material | Benzotriazole-based | 0.30 | 0.29 | 1.5 |

"Acrylic" in Tables 4 and 5 represents TECHNOLLOY S001G

In addition, in the column of change in design in Tables 4 and 5, for example, the description of "A/black~blue" in Example 1 represents that the evaluation result was A, and the film was viewed as black in a case of viewing from the 0° direction and viewed as blue in a case of viewing from the 45° direction.

Furthermore, in Table 6, the light transmittances, at wavelengths of 300 nm and 350 nm, of a solution at 25° C., in which the ultraviolet absorber was dissolved in chloroform at a concentration of 0.001% by mass, are described.

From the results shown in Tables 4 and 5, the decorative films of Examples 1 to 13, 15, and 16 to 32, and the decorative molded film of Example 14 have excellent color variability (designability) depending on viewing direction, and have excellent durability.

In addition, since the decorative film or the decorative molded film has excellent wiping resistance and designability, it is presumed that the decorative molded article to be obtained also has excellent scratch resistance and designability.

On the other hand, it was confirmed that each of Comparative Example 1 not having the protective layer and Comparative Example 2 not having the cholesteric liquid crystal layer is inferior in the change in design and wiping resistance.

The disclosure of JP2018-126374 filed on Jul. 2, 2018 and the disclosure of JP2019-100138 filed on May 29, 2019 are incorporated in the present specification by reference.

All documents, patent applications, and technical standards described in the present specification are incorporated herein by reference to the same extent as in a case of being specifically and individually noted that individual documents, patent applications, and technical standards are incorporated by reference.

EXPLANATION OF REFERENCES

10: decorative film
12: pressure sensitive adhesive layer
14: protective film
16: base material for molding
20: laminate
22: temporary support
24: colored layer
26: resin layer
28: cholesteric liquid crystal layer
30: protective layer
40: decorative molded film

What is claimed is:

1. A decorative film comprising, in the following order:
a temporary support;
a colored layer;
a cholesteric liquid crystal layer; and
a protective layer,
wherein the colored layer is viewable through the cholesteric liquid crystal layer, and
wherein the protective layer contains at least one resin selected from the group consisting of a siloxane resin having voids, a fluororesin, and a urethane resin.

2. The decorative film according to claim 1 further comprising:
a resin layer between the cholesteric liquid crystal layer and the protective layer.

3. The decorative film according to claim 1,
wherein a refractive index of the protective layer is 1.2 to 1.5.

4. The decorative film according to claim 1,
wherein a thickness of the protective layer is 4 µm or more, and
a thickness of the cholesteric liquid crystal layer is less than 4 µm.

5. The decorative film according to claim 1,
wherein a thickness of the cholesteric liquid crystal layer is 1 µm or less.

6. The decorative film according to claim 1,
wherein a thickness of the colored layer is 3 µm or more.

7. The decorative film according to claim 1,
wherein the colored layer includes a pigment as a colorant.

8. The decorative film according to claim 1,
wherein the colored layer is a layer formed by curing at least a bifunctional or trifunctional polymerizable compound which has at least one partial structure selected from the group consisting of a urethane bond and an alkyleneoxy group having 2 or 3 carbon atoms.

9. The decorative film according to claim 1 further comprising:
a layer containing an ultraviolet absorber between the cholesteric liquid crystal layer and the protective layer.

10. The decorative film according to claim 9,
wherein the ultraviolet absorber having a concentration of 0.001% by mass in a chloroform solution at 25° C. has less than 70% of a light transmittance at any wavelengths of 300 nm and 350 nm.

11. The decorative film according to claim 1,
wherein the decorative film is a decorative film for molding.

12. A decorative molded film comprising, in the following order:
a base material;
a colored layer;
a cholesteric liquid crystal layer; and
a protective layer,
wherein the colored layer is viewable through the cholesteric liquid crystal layer, and
wherein the protective layer contains at least one resin selected from the group consisting of a siloxane resin having voids, a fluororesin, and a urethane resin.

13. A decorative molded film comprising, in the following order:
a colored layer;
a cholesteric liquid crystal layer;
a base material; and
a protective layer,
wherein the colored layer is viewable through the cholesteric liquid crystal layer, and
wherein the protective layer contains at least one resin selected from the group consisting of a siloxane resin having voids, a fluororesin, and a urethane resin.

* * * * *